United States Patent
Fantoni et al.

(10) Patent No.: US 10,766,989 B2
(45) Date of Patent: Sep. 8, 2020

(54) FLUOROELASTOMER COMPOSITION

(71) Applicant: SOLVAY SPECIALTY POLYMERS ITALY S.P.A., Bollate (IT)

(72) Inventors: Matteo Fantoni, Vanzaghello (IT); Vito Tortelli, Milan (IT); Cristiano Monzani, Trezzo Sull'adda (IT); Stefano Bossolo, Parabiago (IT); Marco Avataneo, Senago (IT)

(73) Assignee: SOLVAY SPECIALITY POLYMERS ITALY S.P.A., Bollate (MI) (IT)

( * ) Notice: Subject to any disclaimer, the term of this patent is extended or adjusted under 35 U.S.C. 154(b) by 165 days.

(21) Appl. No.: 15/572,656

(22) PCT Filed: May 3, 2016

(86) PCT No.: PCT/EP2016/059812
§ 371 (c)(1),
(2) Date: Nov. 8, 2017

(87) PCT Pub. No.: WO2016/180660
PCT Pub. Date: Nov. 17, 2016

(65) Prior Publication Data
US 2018/0142050 A1    May 24, 2018

(30) Foreign Application Priority Data
May 8, 2015 (EP) .................. 15166963

(51) Int. Cl.
| | | |
|---|---|---|
| C08J 3/24 | (2006.01) | |
| C08K 3/22 | (2006.01) | |
| C08K 5/25 | (2006.01) | |
| C08L 27/16 | (2006.01) | |
| C08K 5/34 | (2006.01) | |
| C08K 5/17 | (2006.01) | |
| C08K 5/20 | (2006.01) | |
| C08F 214/22 | (2006.01) | |
| C08K 5/00 | (2006.01) | |
| C08F 214/26 | (2006.01) | |
| C08K 5/3432 | (2006.01) | |
| C08K 5/3462 | (2006.01) | |

(52) U.S. Cl.
CPC ...... *C08F 214/222* (2013.01); *C08F 214/225* (2013.01); *C08F 214/262* (2013.01); *C08J 3/24* (2013.01); *C08K 3/22* (2013.01); *C08K 5/0025* (2013.01); *C08K 5/17* (2013.01); *C08K 5/20* (2013.01); *C08K 5/34* (2013.01); *C08K 5/3432* (2013.01); *C08K 5/3462* (2013.01); *C08L 27/16* (2013.01); *C08F 2800/20* (2013.01); *C08J 2300/26* (2013.01); *C08J 2327/16* (2013.01); *C08K 2003/2206* (2013.01); *C08K 2003/2217* (2013.01); *C08L 2205/025* (2013.01)

(58) Field of Classification Search
CPC .............. C08F 214/222; C08F 214/225; C08F 214/262; C08F 2800/20; C08J 3/24; C08J 3/22; C08J 2300/26; C08J 2327/16; C08K 5/0025; C08K 5/17; C08K 5/20; C08K 5/34; C08K 5/3432; C08K 5/3462; C08K 2003/2206; C08K 2003/2217; C08K 2005/025; C08L 27/16
USPC .......................................................... 526/247
See application file for complete search history.

(56) References Cited

U.S. PATENT DOCUMENTS

| | | | | |
|---|---|---|---|---|
| 4,734,460 A | * | 3/1988 | Yamada | C08K 3/22 525/279 |
| 4,833,212 A | | 5/1989 | Yamada et al. | |
| 4,929,686 A | * | 5/1990 | Sonoi | C08K 3/22 525/279 |

FOREIGN PATENT DOCUMENTS

| | | |
|---|---|---|
| DE | 3626355 A1 | 4/1987 |
| DE | 3805792 A1 | 9/1988 |
| DE | 3908712 A1 | 11/1989 |
| EP | 661304 A1 | 7/1995 |
| JP | 57164143 A | 10/1982 |

* cited by examiner

*Primary Examiner* — William K Cheung

(57) ABSTRACT

The invention pertains to a fluoroelastomer composition [composition (C)] comprising: —at least one fluoroelastomer [fluoroelastomer (A)]; —at least one basic compound [base (B)]; —at least one pyridinium-type salt [salt (P)] having at least two groups in ortho or para position to the quaternized nitrogen bearing a reactive hydrogen atom.

20 Claims, No Drawings

FLUOROELASTOMER COMPOSITION

CROSS-REFERENCE TO RELATED APPLICATION

This application is a U.S. national stage entry under 35 U.S.C. § 371 of International Application No. PCT/EP2016/059812 filed May 3, 2016, which claims priority to European application No. 15166963.7 filed on May 8, 2015. The entire contents of these applications are explicitly incorporated herein by this reference.

TECHNICAL FIELD

The invention relates to a fluoroelastomer curable composition, to a method for curing the same, and to cured articles derived there from.

BACKGROUND ART

Vulcanized fluoroelastomers have been used in a variety of applications, in particular for manufacturing sealing articles such as oil seals, gaskets, shaft seals and O-rings, because of several desirable properties such as heat resistance, chemical resistance, weatherability, etc.

It is nevertheless required for "as polymerized" fluoroelastomers to undergo curing/crosslinking processes (so-called "vulcanization") in order to ensure required sealing and mechanical properties to be exhibited in final parts.

Several techniques have been developed for ensuring creation of a three-dimensional cured structure able to deliver expected performances; the underlying chemistry generally requires a crosslinking agent to provide for connections between fluoroelastomer polymer chains. Nature and reactivity of the crosslinking agents used enable categorizing cross-linking systems. Most used systems are based either on polyhydroxyaromatic compounds (typically bi-phenols), reacting through "ionic" chemistry in the presence of basic compounds and onium accelerators, via displacement of acidic hydrogen atoms in the chain, or on poly-unsatured compounds, reacting via radical chemistry in the presence of peroxide(s), via displacement of labile groups (typically iodine or bromine atoms) in the chain.

Ionic cross-linking generally leads to cured parts which, although possessing appreciable thermal resistance, yet may be inadequate in certain thermal demanding conditions; furthermore, ionically cured parts are somehow sensitive to certain chemicals, in particular certain acids and bases. Their processing is delicate because of fouling phenomena which may arise, and incorporation of curing agents and accelerant can be a delicate task for ensuring homogenous dispersion and hence homogeneous crosslinking network.

Similarly, peroxide curing lead to parts which can be susceptible of chemical attacks, and may suffer of inadequate thermal resistance in highly demanding applications; on top of this, sealing performances obtained in parts cured by peroxide curing can be poorer than those of similar base elastomers cured by ionic route.

Now, while it is acknowledged that overall performances of the fluoroelastomers will depend upon the nature, molecular structure and composition of the fluoroelastomer itself, it is nevertheless true that chemistry of cross-linking may have a significant impact on the same. Indeed, because cross-linking agents are generally hydrogen-containing compounds, possessing possibly labile and/or reactive groups, and optionally necessitating, for their effectiveness, addition of modifying compounds which may detrimentally affect thermal and/or oxidative stability of the fluoroelastomer, there is a continuous quest in the art for alternative and improved crosslinking system, based on alternative chemistry, delivering outstanding crosslinking ability and hence sealing performances in cured parts, being hence safer and cheaper than the above, and which could obviate to the drawbacks of the ionic or peroxide cross-linking systems of the prior art.

SUMMARY OF INVENTION

The Applicant has now found that fluoroelastomers can be cured through the action of certain pyridinium salts.

It is hence a first object of the present invention a fluoroelastomer composition [composition (C)] comprising:

- at least one vinylidene-fluoride based fluoroelastomer comprising recurring units derived from vinylidene fluoride (VDF) and from at least one additional (per) fluorinated monomer different from VDF [fluoroelastomer (A)],
- at least one basic compound [base (B)];
- at least one pyridinium salt [salt (P)] complying with any of formulae (P1) to (12):

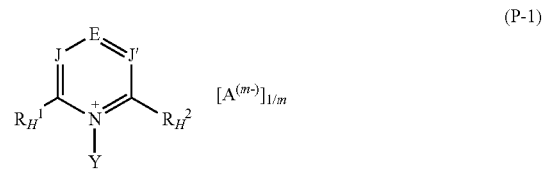

(P-1)

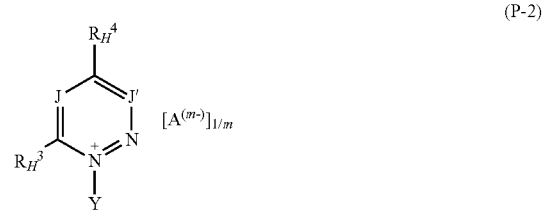

(P-2)

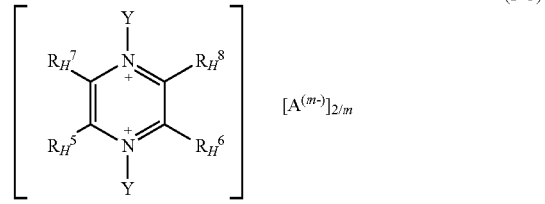

(P-3)

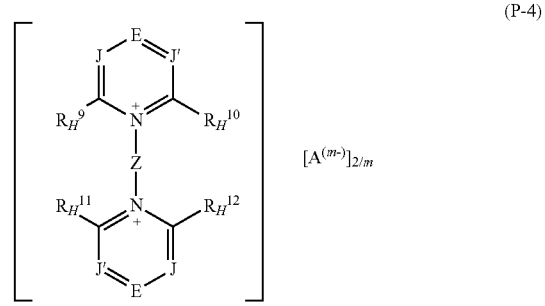

(P-4)

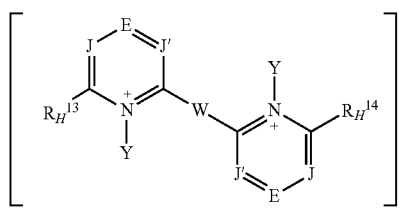
(P-5)

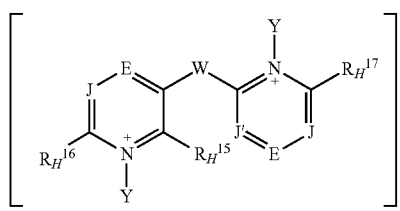
(P-6)

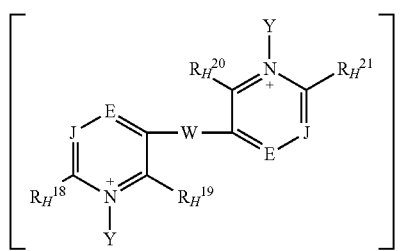
(P-7)

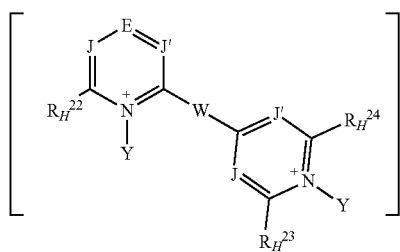
(P-8)

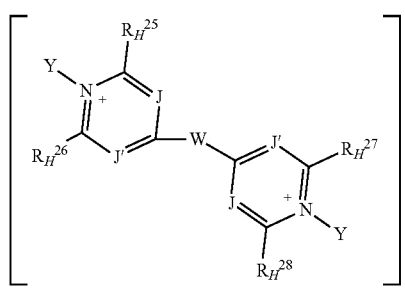
(P-9)

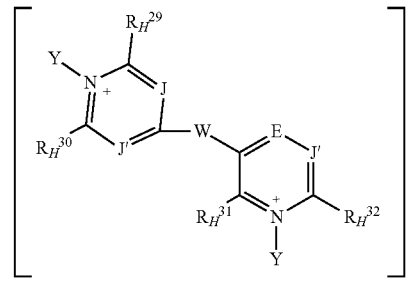
(P-10)

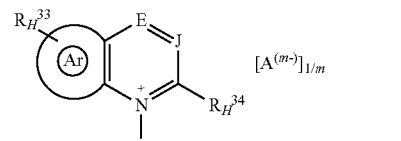
(P-11)

(P-12)

wherein:

each of J and J', equal to or different from each other, is independently at each occurrence C—R* or N, wherein R* is H or a $C_1$-$C_{12}$ hydrocarbon group;

E is N or a group of formula C—R°$_H$;

Z is a divalent hydrocarbon group comprising from 1 to 12 carbon atoms;

W is a bond or is a bridging group selected from the group consisting of divalent hydrocarbon groups comprising from 1 to 12 carbon atoms (preferably divalent aliphatic groups comprising from 1 to 6 carbon atoms) and divalent fluorocarbon groups comprising from 1 to 12 carbon atoms (preferably divalent perfluoroaliphatic groups comprising from 1 to 6 carbon atoms);

the group sketched with symbol:

in formula (P-11) and (P-12) designates an aromatic mono- or poly-nuclear ring condensed to the pyridinium-type aromatic ring, which may comprise one or more additional nitrogen atoms, optionally quaternized nitrogen atoms, in the ring(s);

each of $R^1_H$, $R^2_H$, $R^3_H$, $R^4_H$, $R^5_H$, $R^6_H$, $R^7_H$, $R^8_H$, $R^9_H$, $R^{10}_H$, $R^{11}_H$, $R^{12}_H$, $R^{13}_H$, $R^{14}_H$, $R^{15}_H$, $R^{16}_H$, $R^{17}_H$, $R^{18}_H$, $R^{19}_H$, $R^{20}_H$, $R^{21}_H$, $R^{22}_H$, $R^{23}_H$, $R^{24}_H$, $R^{25}_H$, $R^{26}_H$, $R^{27}_H$, $R^{28}_H$, $R^{29}_H$, $R^{30}_H$, $R^{31}_H$, $R^{32}_H$, $R^{33}_H$, $R^{34}_H$, $R^{35}_H$, $R^{36}_H$ and $R°_H$, equal to or different from each other, is independently at each occurrence —H or a group of formula [group (alpha-H)]:

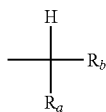

wherein $R_a$, and $R_b$, equal to or different from each other, are independently H or a hydrocarbon $C_1$-$C_6$ group;

Y, equal to or different from each other, is independently oxygen or a $C_1$-$C_{12}$ hydrocarbon group, which can be notably an aliphatic or an aromatic group, which can comprise one or more than one heteroatoms selected from N, O, S and halogens;

$A^{(m-)}$ is an anion having valency m; with the provisio that
(i) when salt (P) is of formula (P-1) at least two of $R^1{}_H$, $R^2{}_H$, and $R°_H$ are groups (alpha-H);
(ii) when salt (P) is of formula (P-2) $R^3{}_H$ and $R^4{}_H$ are groups (alpha-H);
(iii) when salt (P) is of formula (P-3), at least two of $R^5{}_H$, $R^6{}_H$, $R^7{}_H$, and $R^8{}_H$ are groups (alpha-H);
(iv) when salt (P) is of formula (P-4), at least two of $R^9{}_H$, $R^{10}{}_H$, $R^{11}{}_H$, $R^{12}{}_H$, and $R°_H$ are groups (alpha-H);
(v) when salt (P) is of formula (P-5), at least two of $R^{13}{}_H$, $R^{14}{}_H$, and $R°_H$ are groups (alpha-H);
(vi) when salt (P) is of formula (P-6), at least two of $R^{15}{}_H$, $R^{16}{}_H$, $R^{17}{}_H$, and $R°_H$ are groups (alpha-H);
(vii) when salt (P) is of formula (P-7), at least two of $R^{18}{}_H$, $R^{19}{}_H$, $R^{20}{}_H$, $R^{21}{}_H$, and $R°_H$ are groups (alpha-H);
(viii) when salt (P) is of formula (P-8), at least two of $R^{22}{}_H$, $R^{23}{}_H$, $R^{24}{}_H$, and $R°_H$ are groups (alpha-H);
(ix) when salt (P) is of formula (P-9), at least two of $R^{25}{}_H$, $R^{26}{}_H$, $R^{27}{}_H$, and $R^{28}{}_H$ are groups (alpha-H);
(x) when salt (P) is of formula (P-10), at least two of $R^{29}{}_H$, $R^{30}{}_H$, $R^{31}{}_H$, $R^{32}{}_H$, and $R^{28}{}_H$ are groups (alpha-H);
(xi) when salt (P) is of formula (P-11), at least two of $R^{33}{}_H$, $R^{34}{}_H$, and $R^{28}{}_H$ are groups (alpha-H);
(xii) when salt (P) is of formula (P-12), at least two of $R^{35}{}_H$, $R^{36}{}_H$ and $R°_H$ are groups (alpha-H).

The group alpha-H comprises a central carbon atom which bears at least a hydrogen atom and which is covalently bound to a $sp^2$-hybridized carbon of the pyridinium-ring (annular carbon): as the annular carbon is in ortho or para position to the quaternized nitrogen of the pyridinium ring, the hydrogen atom(s) of the group alpha-H possess(es) suitable reactivity to generate, under certain conditions, corresponding carbanions.

The Applicant has surprisingly found that salts (P) of any of formulae (P-1) to (P-12) including a ring-quaternized pyridinium-type nitrogen, and possessing at least two groups in ortho or para position with respect to the said ring-quaternized pyridinium-type nitrogen comprising said reactive hydrogen atoms, when combined with basic compounds, are effective cross-linking agents for the cross-linking of fluoroelastomers. More specifically, molding and cross-linking in the presence of the said crosslinking system have been proven to proceed effectively, with excellent molding and demolding performances, with high yield and substantially no mold fouling in conventional equipments.

Further, in addition, this curing system delivers cured articles having particularly advantageous properties, in particular improved acid resistance properties over, notably, bisphenolic-cured comparable items.

Without being bound by this theory, the Applicant thinks that the groups in the said ortho or para position comprising at least one hydrogen atom in alpha position with respect to the aromatic ring possess acidic character, so as to give rise, in the presence of the base (B), to corresponding carbanion; the so formed carbanions have sufficient reactivity/nucleophilic character to ensure activation and grafting of the fluoroelastomer polymer chain.

DESCRIPTION OF INVENTION

For the purposes of this invention, the term "fluoroelastomer" [fluoroelastomer (A)] is intended to designate a fluoropolymer resin serving as a base constituent for obtaining a true elastomer, said fluoropolymer resin comprising more than 10% wt, preferably more than 30% wt, of recurring units derived from at least one ethylenically unsaturated monomer comprising at least one fluorine atom (hereafter, (per)fluorinated monomer) and, optionally, recurring units derived from at least one ethylenically unsaturated monomer free from fluorine atom (hereafter, hydrogenated monomer).

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Fluoroelastomers (A) are in general amorphous products or products having a low degree of crystallinity (crystalline phase less than 20% by volume) and a glass transition temperature ($T_g$) below room temperature. In most cases, the fluoroelastomer (A) has advantageously a $T_g$ below 10° C., preferably below 5° C., more preferably 0° C., even more preferably below −5° C.

Fluoroelastomer (A) typically comprises at least 15% moles, preferably at least 20% moles, more preferably at least 35% moles of recurring units derived from VDF, with respect to all recurring units of the fluoroelastomer.

Fluoroelastomer (A) typically comprises at most 85% moles, preferably at most 80% moles, more preferably at most 78% moles of recurring units derived from VDF, with respect to all recurring units of the fluoroelastomer.

Non limitative examples of suitable (per)fluorinated monomers, recurring units derived therefrom being comprised in the fluoroelastomer (A), are notably:

(a) $C_2$-$C_8$ perfluorooolefins, such as tetrafluoroethylene (TFE) and hexafluoropropylene (HFP);

(b) hydrogen-containing $C_2$-$C_8$ olefins different from VDF, such as vinyl fluoride (VF), trifluoroethylene (TrFE), perfluoroalkyl ethylenes of formula $CH_2=CH-R_f$, wherein $R_f$ is a $C_1$-$C_6$ perfluoroalkyl group;

(c) $C_2$-$C_8$ chloro and/or bromo and/or iodo-fluoroolefins such as chlorotrifluoroethylene (CTFE);

(d) (per)fluoroalkylvinylethers (PAVE) of formula $CF_2=CFOR_f$, wherein $R_f$ is a $C_1$-$C_6$ (per)fluoroalkyl group, e.g. $CF_3$, $C_2F_5$, $C_3F_7$;

(e) (per)fluoro-oxy-alkylvinylethers of formula $CF_2=CFOX$, wherein X is a $C_1$-$C_{12}$ ((per)fluoro)-oxyalkyl comprising catenary oxygen atoms, e.g. the perfluoro-2-propoxypropyl group;

(f) (per)fluorodioxoles having formula:

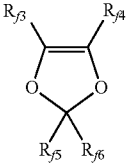

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom, e.g. —$CF_3$, —$C_2F_5$, —$C_3F_7$, —$OCF_3$, —$OCF_2CF_2OCF_3$.

(g) (per)fluoro-methoxy-vinylethers (MOVE, hereinafter) having formula:

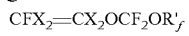

wherein $R''_f$ is selected among $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$=F, H; preferably $X_2$ is F and $R''_f$ is —$CF_2CF_3$ (MOVE1); —$CF_2CF_2OCF_3$ (MOVE2); or —$CF_3$ (MOVE3).

Generally fluoroelastomer (A) will comprise recurring units derived from VDF and recurring units derived from HFP.

Fluoroelastomer (A) may optionally further comprise recurring units derived from one or more than one monomer free from fluorine (hydrogenated monomer, herein after). Examples of hydrogenated monomers are notably $C_2$-$C_8$ non-fluorinated olefins (OI), in particular $C_2$-$C_8$ non-fluorinated alpha-olefins (OI), including ethylene, propylene, 1-butene; diene monomers; styrene monomers; $C_2$-$C_8$ non-fluorinated alpha-olefins (OI), and more particularly ethylene and propylene, will be selected for achieving increased resistance to bases.

Optionally, fluoroelastomer (A) may comprises recurring units derived from at least one bis-olefin [bis-olefin (OF)] having general formula:

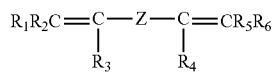

wherein $R_1$, $R_2$, $R_3$, $R_4$, $R_5$ and $R_6$, equal or different from each other, are H, a halogen, or a $C_1$-$C_5$ optionally halogenated group, possibly comprising one or more oxygen group; Z is a linear or branched $C_1$-$C_{18}$ optionally halogenated alkylene or cycloalkylene radical, optionally containing oxygen atoms, or a (per)fluoropolyoxyalkylene radical, e.g. as described in EP 661304 A (AUSIMONT SPA) May 7, 1995.

The bis-olefin (OF) is preferably selected from the group consisting of those complying with formulae (OF-1), (OF-2) and (OF-3):

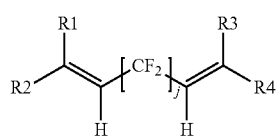
(OF-1)

wherein j is an integer between 2 and 10, preferably between 4 and 8, and R1, R2, R3, R4, equal or different from each other, are H, F or $C_{1-5}$ alkyl or (per)fluoroalkyl group;

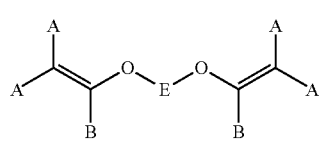
(OF-2)

wherein each of A, equal or different from each other and at each occurrence, is independently selected from F, Cl, and H; each of B, equal or different from each other and at each occurrence, is independently selected from F, Cl, H and $OR_B$, wherein $R_B$ is a branched or straight chain alkyl radical which can be partially, substantially or completely fluorinated or chlorinated; E is a divalent group having 2 to 10 carbon atom, optionally fluorinated, which may be inserted with ether linkages; preferably E is a —$(CF_2)_m$-group, with m being an integer from 3 to 5; a preferred bis-olefin of (OF-2) type is $F_2C$=CF—O—$(CF_2)_5$—O—CF=$CF_2$.

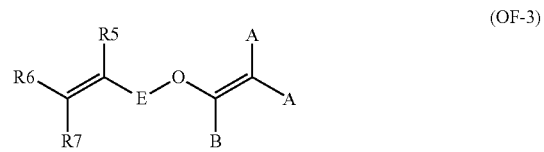
(OF-3)

wherein E, A and B have the same meaning as above defined; R5, R6, R7, equal or different from each other, are H, F or $C_{1-5}$ alkyl or (per)fluoroalkyl group.

Fluoroelastomers (A) suitable in the compositions of the invention may comprise, in addition to recurring units derived from VDF and HFP, one or more of the followings:
  recurring units derived from at least one bis-olefin [bis-olefin (OF)] as above detailed;
  recurring units derived from at least one (per)fluorinated monomer different from VDF and HFP; and
  recurring units derived from at least one hydrogenated monomer.

Among specific monomer compositions of fluoroelastomers (A) suitable for the purpose of the invention, mention can be made of fluoroelastomers having the following monomer compositions (in mol %):

(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;

(ii) vinylidene fluoride (VDF) 50-80%, perfluoroalkyl vinyl ethers (PAVE) 5-50%, tetrafluoroethylene (TFE) 0-20%, bis-olefin (OF) 0-5%;

(iii) vinylidene fluoride (VDF) 20-30%, $C_2$-$C_8$ non-fluorinated olefins (OI) 10-30%, hexafluoropropene (HFP) and/or perfluoroalkyl vinyl ethers (PAVE) 18-27%, tetrafluoroethylene (TFE) 10-30%, bis-olefin (OF) 0-5%;

(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%;

(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%.

Preferred salts (P) of formula (P-1) are those complying with formulae (P-1-a) to (P-1-e):

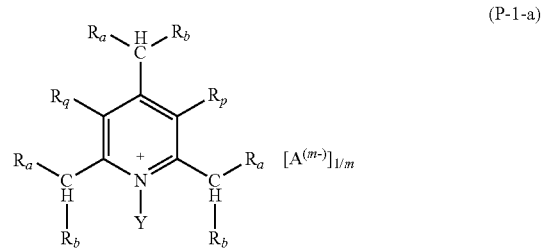
(P-1-a)

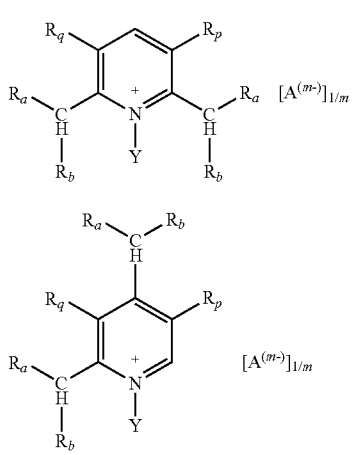
(P-1-b)

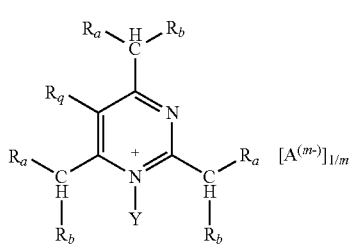
(P-1-c)

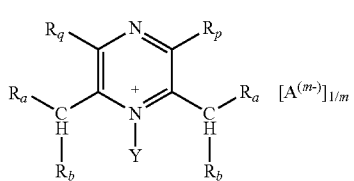
(P-1-d)

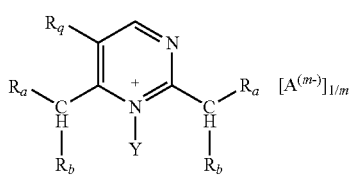
(P-1-e)

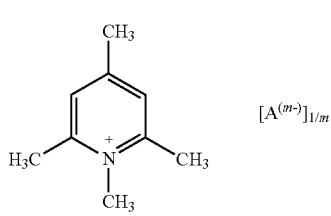
(P-1-f)

wherein:

$R_a$ and $R_b$ have the meaning as above defined, preferably $R_a$ and $R_b$ are H;

Y has the meaning as defined above, preferably Y is methyl;

each of $R_p$ and $R_q$, equal to or different from each other, is H or a $C_1$-$C_{12}$ hydrocarbon group;

A and m have the meanings as above defined.

More preferably, salts (P) of formula (P-1) are those having any of formulae (P-1-g) to (P-1-p):

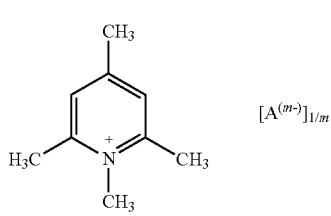
(P-1-g)

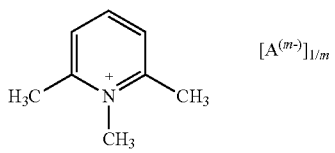
(P-1-h)

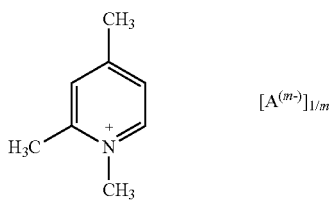
(P-1-i)

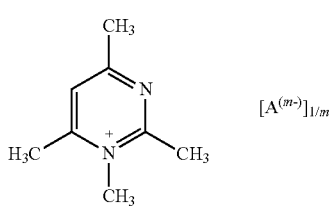
(P-1-l)

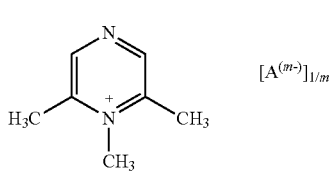
(P-1-m)

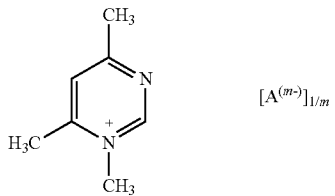
(P-1-n)

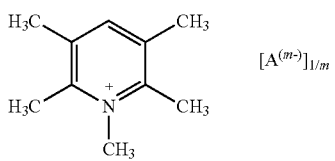
(P-1-o)

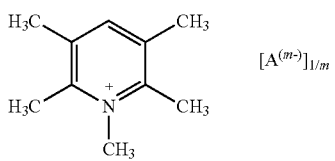
(P-1-p)

wherein A and m have the meaning as above detailed.

Preferred salts (P) of formula (P-2) are those complying with formula (P-2-a):

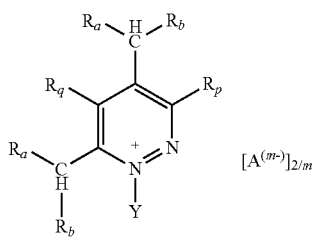

(P-2-a)

wherein:

$R_a$ and $R_b$ have the meaning as above defined, preferably $R_a$ and $R_b$ are H;

Y has the meaning as defined above, preferably Y is methyl;

each of $R_p$ and $R_q$, equal to or different from each other, is H or a $C_1$-$C_{12}$ hydrocarbon group;

A and m have the meanings as above defined.

More preferably, salts (P) of formula (P-2) are those having formula (P-2-b)

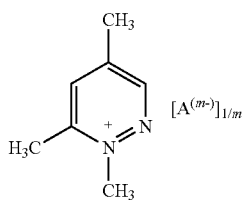

(P-2-b)

wherein A and m have the meaning as above detailed.

Preferred salts (P) of formula (P-3) are those complying with formula (P-3-a):

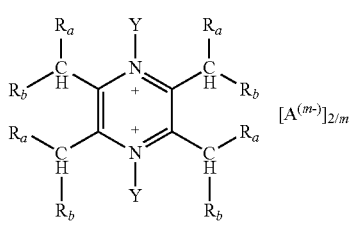

(P-3-a)

wherein:

$R_a$ and $R_b$ have the meaning as above defined, preferably $R_a$ and $R_b$ are H;

Y has the meaning as defined above, preferably Y is methyl;

A and m have the meanings as above defined.

More preferably, salts (P) of formula (P-3) are those having formula (P-3-b)

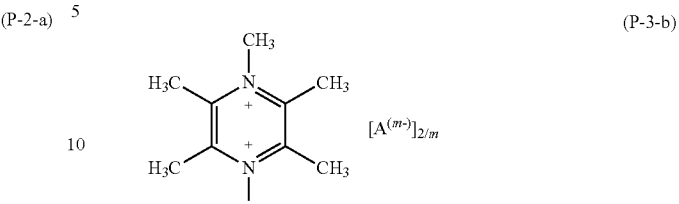

(P-3-b)

wherein A and m have the meaning as above detailed.

Preferred salts (P) of formula (P-4) are those complying with formula (P-4-a):

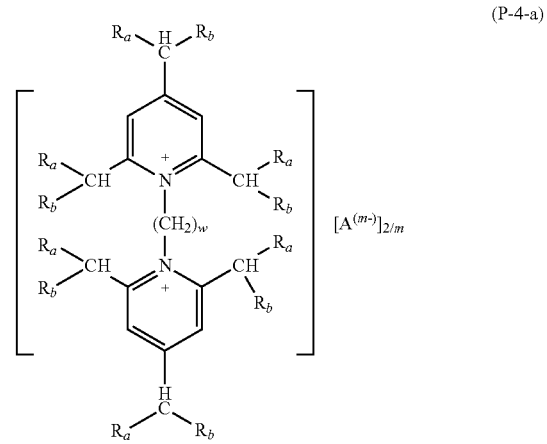

(P-4-a)

wherein:

$R_a$ and $R_b$ have the meaning as above defined, preferably $R_a$ and $R_b$ are H;

w is an integer of 1 to 12, preferably of 1 to 6, most preferably equal to 3;

A and m have the meanings as above defined.

More preferably, salts (P) of formula (P-4) are those having formula (P-4-b) or (P-4-c):

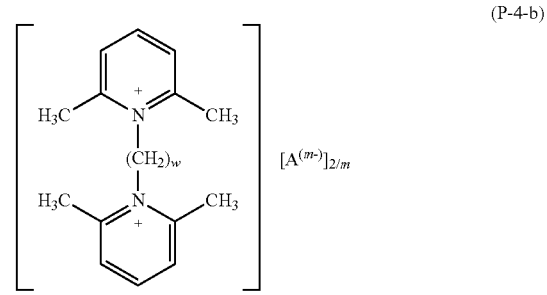

(P-4-b)

-continued

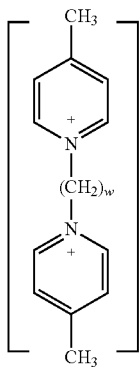
(P-4-c)

wherein A, and m have the meaning as above detailed, and w=3.

Preferred salts (P) of formula (P-5) are those complying with formula (P-5-a):

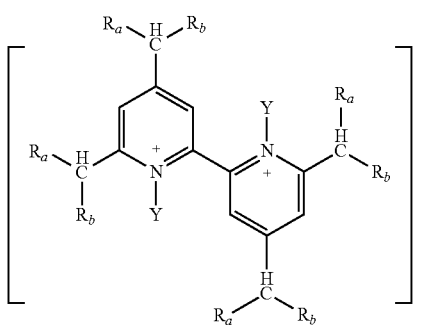
(P-5-a)

wherein:
$R_a$ and $R_b$ have the meaning as above defined, preferably $R_a$ and $R_b$ are H;
Y has the meaning as defined above, preferably Y is methyl;
A and m have the meanings as above defined.

More preferably, salts (P) of formula (P-5) are those having formula (P-5-b) or (P-5-c):

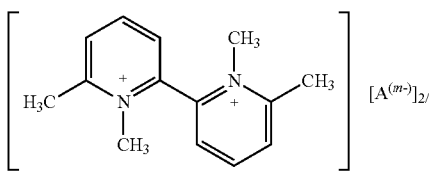
(P-5-b)

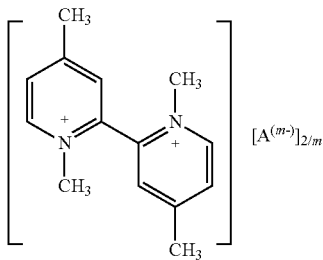
(P-5-c)

wherein A and m have the meaning as above detailed.

Preferred salts (P) of formula (P-11) are those complying with formula (P-11-a):

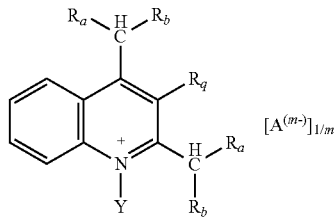
(P-11-a)

wherein:
$R_a$ and $R_b$ have the meaning as above defined, preferably $R_a$ and $R_b$ are H;
Y has the meaning as defined above, preferably Y is methyl;
A and m have the meanings as above defined.

More preferably, salts (P) of formula (P-11) are those having formula (P-11-b):

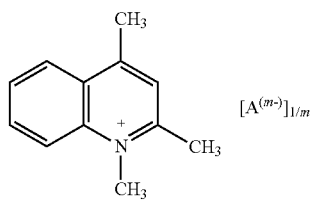
(P-11-b)

wherein A and m have the meaning as above detailed.

Preferred salts (P) of formula (P-12) are those complying with formula (P-12-a):

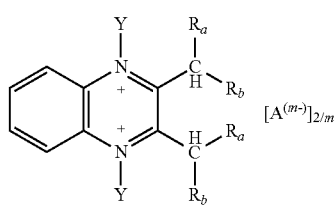
(P-12-a)

wherein:
$R_a$ and $R_b$ have the meaning as above defined, preferably $R_a$ and $R_b$ are H;
Y has the meaning as defined above, preferably Y is methyl;
A and m have the meanings as above defined.

More preferably, salts (P) of formula (P-12) are those having formula (P-12-b):

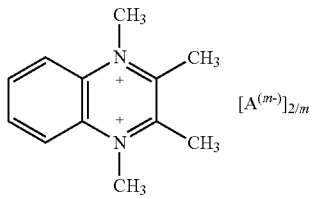

(P-12-b)

wherein A and m have the meaning as above detailed.

The choice of the anion A in formulae (P-1) to (P-12) is not particularly critical; it is nevertheless understood that anions selected from the group consisting of arylsulfonates, in particular, tosylate (p-toluensulfonate), (fluoro)alkyl sulfonates having a $C_1$-$C_6$ (fluoro)alkyl chain, including fluorine-free alkyl sulfonates e.g. mesylate (methansulfonate) and fluorine containing (especially perfluorinated) alkyl sulfonates, e.g. triflate (trifluoromethansulfonate); halides (iodide, bromide, chloride) are particularly preferred because of their prompt accessibility from synthetic perspective.

As a whole, exemplary compounds which have been found particular utility in the composition of the present invention are those listed below having formulae (Ex-1) to (Ex-9):

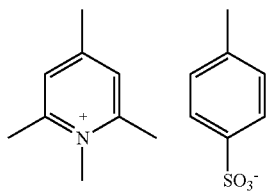

(Ex-1)

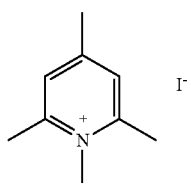

(Ex-2)

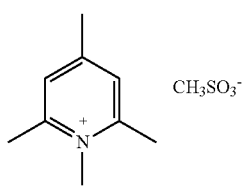

(Ex-3)

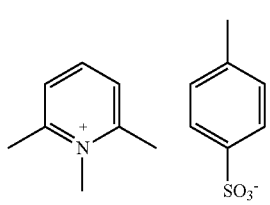

(Ex-4)

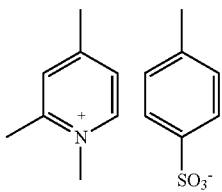

(Ex-5)

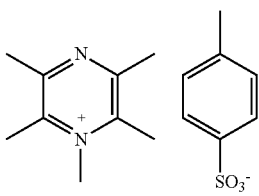

(Ex-6)

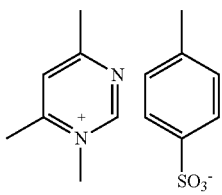

(Ex-7)

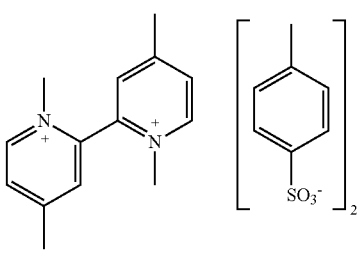

(Ex-8)

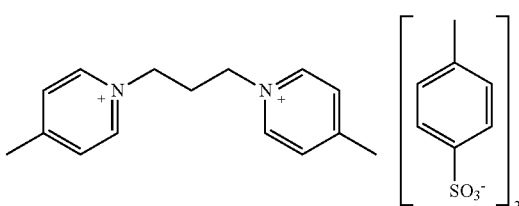

(Ex-9)

On the other side, as it will become apparent from comparative data provided, compounds which fail to possess the specific structural features of ring-quaternized pyridinium salts of formula (P1) to (P11) are not effective in cross-linking of fluoroelastomers. Examples of compounds which fails to possess at least two groups in ortho or para position with respect to a ring-quaternized pyridinium-type nitrogen, hence different from salts (P), and which are ineffective, are those of formulae (Ex-10c) to (Ex-13c):

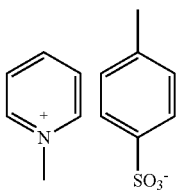

(Ex-10c)

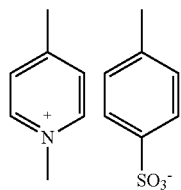
(Ex-11c)

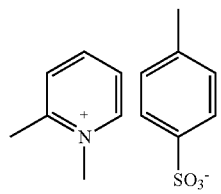
(Ex-12c)

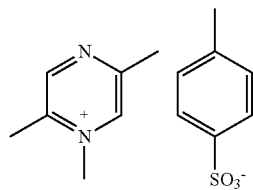
(Ex-13c)

The composition of the invention generally comprises salt (P) in an amount of at least 0.1, preferably at least 0.5, more preferably at least 1 weight part per 100 weight parts of fluoroelastomer (A) (phr).

The composition of the invention generally comprises salt (P) in an amount of at most 20, preferably at most 15, more preferably at most 10 weight parts per 100 weight parts of fluoroelastomer (A).

The base (B) suitable for being used in the composition (C) of the present invention is not particularly limited. One or more than one organic base, one or more than one inorganic base or mixtures of organic and inorganic base(s) (B) can be used.

Among inorganic bases [bases (IB)] mention can be notably made of:

i) divalent metal oxides, in particular oxides of alkali-earth metals or oxides of Zn, Mg, Pb, Ca, including specifically MgO, PbO and ZnO;

ii) hydroxides of metals, in particular hydroxides of monovalent and divalent metals, specifically hydroxides of alkali and alkali-earth metals, in particular hydroxides selected from the group consisting of $Ca(OH)_2$, $Sr(OH)_2$, and $Ba(OH)_2$;

(iii) metal salts of weak acids having a $pK_a$ higher than 3, in particular weak acids selected from the group consisting of carbonates, benzoates, oxalates and phosphites; in particular Na, K, Ca, Sr, Ba salts of carbonates, benzoates, oxalates and phosphites.

Among inorganic bases, $Ca(OH)_2$ has been found to be particularly effective.

Among organic based [bases (OB)] mention can be notably made of:

(j) non-aromatic amines or amides complying with general formula (B1m) or (B1d):

 (B1m)

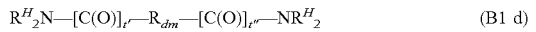 (B1d)

wherein:
each of t, t' and t'', equal to or different from each other and at each occurrence is zero or 1;

each of $R^H$ is independently H or a $C_1$-$C_{12}$ hydrocarbon group;
$R_{bm}$ is a monovalent hydrocarbon non-aromatic group having 1 to 30 carbon atoms;
$R_{bm}$ is a divalent hydrocarbon non-aromatic group having 1 to 30 carbon atoms; and (jj) cycloaliphatic secondary or tertiary amines complying with general formula (B2m) or (B2d):

(B2m)

(B2d)

wherein:
Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;
Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto;

(jjj) aromatic amines or amides complying with general formula (B3):

 (B3)

wherein:
t, equal to or different from each other and at each occurrence, is zero or 1;
w is an integer of 1 to 4;
each of $R^H$ is independently H or a $C_1$-$C_{12}$ hydrocarbon group;
$Ar_b$ is a mono- or poly-nuclear aromatic group, possibly comprising one or more than one catenary heteroatoms selected from the group consisting of S and O;

(jv) heteroaromatic amines comprising at least one nitrogen atom comprised in a heteroaromatic cycle, in particular pyridine derivatives;

(v) guanidine derivatives of formula (B4) or (B5):

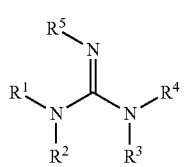
(B4)

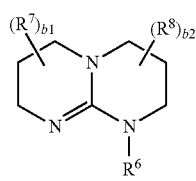
(B5)

wherein:
each of $R^1$, $R^2$, $R^3$, $R^4$, $R^5$, $R^6$, $R^7$, and $R^8$, equal to or different from each other, is independently H or a $C_1$-$C_{12}$ hydrocarbon group and corresponding salts of said guanidines (B4) and (B5), in particular corresponding N-quaternized hydrohalides (preferably hydrochlorides);

(vj) metal alkoxylates, preferably alkoxylates of aliphatic alcohols.

Among bases of formulae (B1m) and (Bid), those wherein:
$R_{bm}$ is a monovalent aliphatic linear group having 6 to 30 carbon atoms, possibly comprising one or more than one ethylenically unsaturated double bond; and
$R_{dm}$ is a divalent aliphatic linear group having 6 to 30 carbon atoms, possibly comprising one or more than one ethylenically unsaturated double bond,
are particularly preferred.

Among the said non-aromatic amines or amides, mention can be particularly made of:
octadecylamine of formula $CH_3(CH_2)_{17}$—$NH_2$;
erucamide of formula $H_2N$—$C(O)$—$(CH_2)_{11}$—$CH$=$CH$—$(CH_2)_7CH_3$;
oleamide of formula $H_2N$—$C(O)$—$(CH_2)_7$—$CH$=$CH$—$(CH_2)_7CH_3$;
hexamethylenediamine of formula $H_2N$—$(CH_2)_6$—$NH_2$;
N,N-dimethyloctylamine;
N,N-dimethyldodecylamine;
trioctylamine;
trihexylamine.

Among the said cycloaliphatic secondary or tertiary amines, mention can be made of 1,8-diazabicycloundec-7-ene (DBU) of formula:

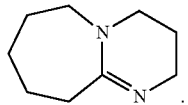

Exemplary embodiments of said guanidine derivatives of formula (B-4) are notably guanidine hydrochloride and di-o-tolylguanidine.

Exemplary embodiments of said metal alkoxylates are notably potassium terbutylate, sodium ethylate and sodium methylate.

Exemplary embodiments of said heteroaromatic amines are notably trimethylpyridine isomers.

The amount of base (B) will be adjusted by one of ordinary skills in the art, taking into account the nature and basicity of base (B) used.

It is nevertheless understood that the composition (C) generally comprises from 0.2 to 20, preferably from 6 to 16 weight parts of said base (B) (organic and/or inorganic, as above detailed) per 100 weight parts of fluoroelastomer (A).

According to certain preferred embodiments, the composition (C) comprises at least one organic base and at least one inorganic base. In these circumstances, the composition (C) generally comprises from 0.1 to 10, preferably from 6 to 16 weight parts of said inorganic base and/or generally, from 0.1 to 10, preferably from 6 to 16 weight parts of said organic base, these weight parts being referred to 100 weight parts of fluoroelastomer (A).

The composition (C) may additionally comprise one or more than one organic solvents [solvent (S)].

The said organic solvent is particularly selected from those wherein the used salt (P) has a solubility at room temperature exceeding 1 g/l, preferably 10 g/l.

Non-limitative examples of solvents (S) which can be used are notably:
polar aprotic organic solvents, selected preferably from the group consisting of sulfolane, 4,4'-dichlorodiphenylsulfone;
ionic liquids, selected preferably from the group consisting of methylpyrrolidinium bis(trifluoromethansulonylimide) of formula PY1,4-Tf$_2$N and 1-butyl-3-methylimidazolium bis(trifluoromethylsulfonylimide) of formula BMIm-Tf$_2$N:

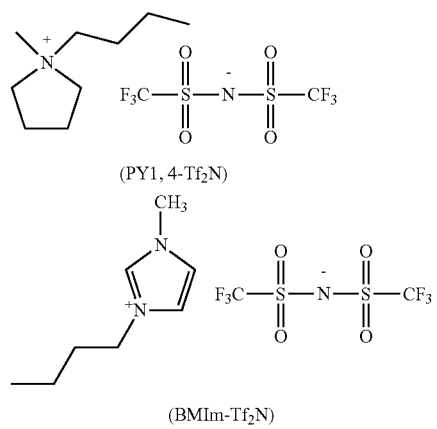

Without being bound by this theory, the Applicant believes that the organic solvent might behave as an aid for plasticizing and swelling the composition (C) and enabling easier penetration of the salt (P) in close connection with (per)fluoroelastomer polymer chain during the formation of the three-dimensional network.

Also, other conventional additives, such as reinforcing fillers (e.g. carbon black), thickeners, pigments, antioxidants, stabilizers and the like, may then be added to the composition (C).

The invention also pertains to a method of using the composition (C), as above described, for fabricating shaped articles.

The composition (C) can be fabricated, e.g. by moulding (injection moulding, extrusion moulding), calendering, or extrusion, into the desired shaped article, which is advantageously subjected to vulcanization (curing) during the processing itself and/or in a subsequent step (post-treatment or post-cure), advantageously transforming the relatively soft, weak, fluoroelastomer (A) into a finished article made of non-tacky, strong, insoluble, chemically and thermally resistant cured fluoroelastomer.

Finally, the invention pertains to cured articles obtained from the composition (C), as above detailed.

The cured articles can be notably pipes, joints, O-ring, hose, and the like.

Should the disclosure of any of the patents, patent applications, and publications that are incorporated herein by reference conflict with the present description to the extent that it might render a term unclear, the present description shall take precedence.

The invention will be now described with reference to the following examples, whose purpose is merely illustrative and not intended to limit the scope of the invention.

EXAMPLES

Preparative Example 1—1,2,4,6-tetramethyl-pyridinium p-toluenesulphonate of Formula (Ex-1)

A three-necked round bottom flask equipped with thermometer, condenser and stirring was charged with $CH_2Cl_2$ (85 ml) and methyl-p-toluenesulphonate (25.50 g). Then 2,4,6 trimethylpyridine (16.59 g) was added drop-wise at room temperature. The reaction was stirred at 50° C. and, after 22 hours, it was completed. The liquid phase was removed by evaporation under vacuum obtaining a white powder that was dispersed in diethyl-ether (50 ml) under stirring. The liquid phase was filtered off and 39.13 g of pure product was recovered as a white powder in 93% yield (melting point 161° C.; 1% weight loss: 266° C.).

$^1$H NMR (solvent $D_2O$, TMS reference): +7.70 ppm (d; 2H; ortho-H; p-toluenesulphonate); +7.55 (s; 2H; meta-H; 1,2,4,6-tetramethyl-pyridinium); +7.39 (d; $^2$H; meta-H; p-toluenesulphonate); +4.0 (s; 3H; $NCH_3$; 1,2,4,6-tetramethyl-pyridinium); +2.74 (s; 6H; ortho-CH3; 1,2,4,6-tetramethyl-pyridinium); 2.53 (s; 3H; para-$CH_3$; 1,2,4,6-tetramethyl-pyridinium); +2.44 ppm (s; 3H; para-$CH_3$; p-toluenesulphonate).

Preparative Example 2—1,2,4,6-tetramethyl-pyridinium Iodide of Formula (Ex-2)

A three-necked round bottom flask equipped with thermometer, condenser and stirring was charged with $CH_2Cl_2$ (73 ml) and methyl iodide (48.80 g). Then 2,4,6 trimethylpyridine (14.17 g) was added drop-wise at room temperature. The reaction was stirred at 50° C. and, after 22 hours, it was completed. The liquid phase was removed by evaporation under vacuum obtaining a white powder that was dispersed in diethyl-ether (73 ml) under stirring. The liquid phase was filtered off and 30.20 g of pure product was recovered as a white powder in 98% yield (melting point 215° C., dec.; 1% weight loss: 215° C.).

$^1$H NMR (solvent $D_2O$, TMS reference): +7.50 (s; 2H; meta-H); +3.95 (s; 3H; $NCH_3$); +2.70 (s; 6H; ortho-$CH_3$); +2.40 ppm (s; 3H; para-$CH_3$).

Preparative Example 3—1,2,4,6-tetramethyl-pyridinium Methanesulphonate of Formula (Ex-3)

A three-necked round bottom flask equipped with thermometer, condenser and stirring was charged with $CH_3CN$ (25 ml) and methyl methanesulphonate (4.50 g). Then 2,4,6 trimethylpyridine (5.0 g) was added drop-wise at room temperature. The reaction was stirred at 80° C. and, after 22 hours, it was completed. The liquid phase was removed by evaporation under vacuum obtaining a white powder that was dispersed in diethyl-ether (25 ml) under stirring. The liquid phase was filtered off and 8.54 g of pure product was recovered as a white powder in 95.7% yield (melting point 157.5° C., dec.; 1% weight loss: 265° C.).

$^1$H NMR (solvent $CDCl_3$, TMS reference): +7.40 (s; 2H; meta-H); +4.20 (s; 3H; $NCH_3$); +2.80 (s; 6H; ortho-$CH_3$); +2.56 ppm (s; 3H; $CH_3SO_3$); +2.48 ppm (s; 3H; para-$CH_3$).

Preparative Example 4—1,2,6-trimethyl-pyridinium p-toluenesulphonate of Formula (Ex-4)

A three-necked round bottom flask equipped with thermometer, condenser and stirring was charged with $CH_2Cl_2$ (163 ml) and methyl-p-toluenesulphonate (52.14 g). Then 2,6 dimethylpyridine (30 g) was added drop-wise at room temperature. The reaction was stirred at 50° C. and, after 23 hours, it was completed. The liquid phase was removed by evaporation under vacuum obtaining a white powder that was dispersed in diethyl-ether (200 ml) under stirring. The liquid phase was filtered off and 58.06 g of pure product was recovered as a white powder in 71% yield (melting point 157.6° C.; 1% weight loss: 256° C.).

$^1$H NMR (solvent $D_2O$, TMS reference): +8.14 ppm (t; 1H; para-H; 1,2,6-trimethyl-pyridinium); +7.66 ppm (m; 4H; ortho-H; p-toluenesulphonate and meta-H; 1,2,6-trimethyl-pyridinium); +7.33 (d; 2H; meta-H; p-toluenesulphonate); +4.00 (s; 3H; $NCH_3$; 1,2,6-trimethyl-pyridinium); +2.74 (s; 6H; ortho-$CH_3$; 1,2,6-trimethyl-pyridinium); +2.38 ppm (s; 3H; para-$CH_3$; p-toluenesulphonate).

Preparative Example 5—1,2,4-trimethyl-pyridinium p-toluenesulphonate of Formula (Ex-5)

A three-necked round bottom flask equipped with thermometer, condenser and stirring was charged with $CH_2Cl_2$ (163 ml) and methyl-p-toluenesulphonate (52.14 g). Then 2,6 dimethylpyridine (30 g) was added drop-wise at room temperature. The reaction was stirred at 50° C. and, after 23 hours, it was completed. The liquid phase was removed by evaporation under vacuum obtaining a white/pink powder that was dispersed in diethyl-ether (200 ml) under stirring. The liquid phase was filtered off and 79.70 g of pure product was recovered as a white powder in 97% yield (melting point 88.1° C.; 1% weight loss: 279° C.).

$^1$H NMR (solvent D2O, TMS reference): +8.40 ppm (d; 1H; ortho-H; 1,2,4-trimethyl-pyridinium); +7.66 ppm (m; 3H; ortho-H; p-toluenesulphonate and meta-H; 1,2,4-trimethyl-pyridinium); +7.56 ppm (d; 1H; meta-H; 1,2,4-trimethyl-pyridinium); +7.33 (d; 2H; meta-H; p-toluenesulphonate); +4.10 (s; 3H; $NCH_3$; 1,2,4-trimethyl-pyridinium); +2.68 (s; 3H; ortho-$CH_3$; 1,2,4-trimethyl-pyridinium); +2.54 (s; 3H; para-$CH_3$; 1,2,4-trimethyl-pyridinium); +2.39 ppm (s; 3H; para-$CH_3$; p-toluenesulphonate).

Preparative Example 6—1,2,3,5,6-pentamethyl-pyrazinium p-toluenesulphonate of Formula (Ex-6)

A three-necked round bottom flask equipped with thermometer, condenser and stirring was charged with $CH_3CN$ (120 ml) and methyl-p-toluenesulphonate (43.99 g). Then 2,3,5,6-tetramethylpyrazine (20 g) was added drop-wise at room temperature. The reaction was stirred at 90° C. and, after 20 hours, it was completed. From the reaction mixture precipitated a pale pink solid that was dispersed in diethyl-ether (200 ml) under stirring. The liquid phase was filtered off and 38.09 g of pure product was recovered as a white powder in 80.4% yield (melting point 141° C.; 1% weight loss: 200° C.).

$^1$H NMR (solvent $D_2O$, TMS reference): +7.70 ppm (d; 2H; ortho-H; p-toluenesulphonate); +7.40 (d; 2H; meta-H; p-toluenesulphonate); +4.2 (s; 3H; NCH3; 1,2,3,5,6-pentamethyl-pyrazinium); +2.80 (m; 12H; $CH_3$; 1,2,3,5,6-pentamethyl-pyrazinium); 2.50 (s; 3H; para-$CH_3$; p-toluenesulphonate).

Preparative Example 7—1,4,6-trimethyl-pyrimidinium p-toluenesulphonate of Formula (Ex-7)

A three-necked round bottom flask equipped with thermometer, condenser and stirring was charged with $CH_3CN$ (60 ml) and methyl-p-toluenesulphonate (14.73 g). Then 4,6 dimethylpyrimidine (7.44 g) was added drop-wise at room temperature. The reaction was stirred at 60° C. and, after 23 hours, it was completed. The liquid phase was removed by evaporation under vacuum obtaining a yellow powder that was dispersed in diethyl-ether (35 ml) under stirring. The liquid phase was filtered off and 19.2 g of pure product were recovered as a pale yellow powder in 93% yield (melting point 150° C.; 1% weight loss: 205° C.).

$^1$H NMR (solvent $D_2O$, TMS reference): +9.35 ppm (s; 1H; ortho-H; 1,4,6-trimethyl-pyrimidinium); +7.95 ppm (s; 1H; meta-H; 1,4,6-trimethyl-pyrimidinium); +7.74 ppm (d; 2H; ortho-H; p-toluenesulphonate); +7.42 (d; 2H; meta-H; p-toluenesulphonate); +4.20 (s; 3H; $NCH_3$; 1,4,6-trimethyl-pyrimidinium); +2.80 (m; 6H; $CH_3$; 1,4,6-trimethyl-pyrimidinium); +2.48 ppm (s; 3H; para-$CH_3$; p-toluenesulphonate).

Preparative Example 8—1,1',4,4'-tetramethyl-2,2'-dipyridinium p-toluenesulphonate of Formula (Ex-8)

A three-necked round bottom flask equipped with thermometer, condenser and stirring was charged with $CH_3CN$ (15 ml) and methyl-p-toluenesulphonate (9.03 g). Then 4,4'-dimethyl-2,2'-dipyridyl (2.50 g) was added drop-wise at room temperature. The reaction was stirred at 85° C. and, after 20 hours, it was completed. The liquid phase was removed by evaporation under vacuum obtaining a pale pink powder that was dispersed in $CH_2Cl_2$ (50 ml) under stirring. The liquid phase was filtered off and 7.05 g of pure product was recovered as a white powder in 93% yield (melting point 216.03° C. dec.; 1% weight loss: 216.03° C.).

$^1$H NMR (solvent $D_2O$, TMS reference): +8.94 ppm (m; 2H; ortho-H; 1,1',4,4'-tetramethyl-2,2'-dipyridinium); +8.12 ppm (m; 4H; meta-H; 1,1',4,4'-tetramethyl-2,2'-dipyridinium); +7.66 ppm (d; 4H; ortho-H; p-toluenesulphonate); +7.36 (d; 4H; meta-H; p-toluenesulphonate); +4.10 (s; 6H; $NCH_3$; 1,1',4,4'-tetramethyl-2,2'-dipyridinium); +2.74 (s; 6H; para-CH3; 1,1',4,4'-tetramethyl-2,2'-dipyridinium); +2.40 ppm (s; 6H; para-$CH_3$; p-toluenesulphonate).

Preparative Example 9—1,3-propyl-4,4'-dimethyldipyridinium p-toluenesulphonate of Formula (Ex-9)

A three-necked round bottom flask equipped with thermometer, condenser and stirring was charged with 1,3-Propanediol di-p-tosylate (13.70 g). Then 4-methyl-pyridine (33.16 g) was added drop-wise at room temperature. The reaction was stirred at 75° C. and, after 1 hours, it was completed. The liquid phase was removed by evaporation under vacuum obtaining a red viscous oil. The oil was treated with a mixture of diethyl ether (50 ml) and $CH_2Cl_2$ (1.5 ml) under stirring and readily a pale pink solid precipitates. The liquid phase was filtered off and 20.03 g of pure product was recovered as a hygroscopic pale pink powder in 92% yield (melting point 117° C.; 2% weight loss: 292° C.).

$^1$H NMR (solvent $D_2O$, TMS reference): +8.68 ppm (m; 4H; ortho-H; 1,3-propyl-4,4'-dimethyldipyridinium); +7.93 ppm (m; 4H; meta-H; 1,3-propyl-4,4'-dimethyldipyridinium); +7.72 ppm (d; 4H; ortho-H; p-toluenesulphonate); +7.40 (d; 4H; 1,3-propyl-4,4'-dimethyldipyridinium); +4.73 (t; 4H; $NCH_2$—; 1,3-propyl-4,4'-dimethyldipyridinium); +2.75 (m; 8H; para-$CH_3$ and —$CH_2$—; 1,3-propyl-4,4'-dimethyldipyridinium); +2.44 ppm (s; 6H; para-$CH_3$; p-toluenesulphonate).

Preparative Example 10
Comparison—1-methyl-pyridinium p-toluenesulphonate of Formula (Ex-10c)

A three-necked round bottom flask equipped with thermometer, condenser and stirring was charged with $CH_2Cl_2$ (25 ml) and methyl-p-toluenesulphonate (18.13 g). Then pyridine (7 g) was added drop-wise at room temperature. The reaction was stirred at 50° C. and, after 5 hours, it was completed. The liquid phase was removed by evaporation under vacuum obtaining a white powder that was dispersed in diethyl-ether (80 ml) under stirring. The liquid phase was filtered off and 23.38 g of pure product was recovered as a white powder in 99% yield (melting point 140.7° C.; 1% weight loss: 279° C.).

$^1$H NMR (solvent $D_2O$, TMS reference): +8.74 ppm (d; 2H; ortho-H; 1-methyl-pyridinium); +8.50 ppm (t; 1H; para-H; 1-methyl-pyridinium); +8.0 ppm (t; 2H; meta-H; 1-methyl-pyridinium); +7.68 ppm (d; 2H; ortho-H; p-toluenesulphonate); +7.35 ppm (d; 2H; meta-H; p-toluenesulphonate); +4.40 ppm (s; 3H; NCH3; 1-methyl-pyridinium); +2.40 ppm (s; 3H; para-CH3; p-toluenesulphonate).

Preparative Example 11
Comparison—1,4-dimethyl-pyridinium p-toluenesulphonate of Formula (Ex-11c)

A three-necked round bottom flask equipped with thermometer, condenser and stirring was charged with $CH_2Cl_2$ (85 ml) and methyl-p-toluenesulphonate (44 g). Then 4-methyl-pyridine (20 g) was added drop-wise at room temperature. The reaction was stirred at 50° C. and, after 24 hours, it was completed. The liquid phase was removed by evaporation under vacuum obtaining a white powder that was dispersed in diethyl-ether (150 ml) under stirring. The liquid phase was filtered off and 58 g of pure product was recovered as a white powder in 96.7% yield (melting point 154° C.; 1% weight loss: 280° C.).

$^1$H NMR (solvent $D_2O$, TMS reference): +8.52 ppm (d; 2H; ortho-H; 1,4-dimethyl-pyridinium); +7.80 ppm (d; 2H; meta-H; 1,4-dimethyl-pyridinium); +7.67 ppm (d; 2H; ortho-H; p-toluenesulphonate); +7.36 ppm (d; 2H; meta-H; p-toluenesulphonate); +4.27 ppm (s; 3H; $NCH_3$; 1,4-dimethyl-pyridinium); +2.62 ppm (s; 3H; para-$CH_3$; 1,4-dimethyl-pyridinium); +2.40 ppm (s; 3H; para-$CH_3$; p-toluenesulphonate).

Preparative Example 12
Comparison—1,2-dimethyl-pyridinium p-toluenesulphonate of Formula (Ex-12c)

A three-necked round bottom flask equipped with thermometer, condenser and stirring was charged with $CH_2Cl_2$ (84 ml) and methyl-p-toluenesulphonate (44 g). Then 4-methyl-pyridine (20 g) was added drop-wise at room temperature. The reaction was stirred at 50° C. and, after 24 hours, it was completed. The liquid phase was removed by evaporation under vacuum obtaining a white powder that was dispersed in diethyl-ether (150 ml) under stirring. The liquid phase was filtered off and 58.48 g of pure product was recovered as a white powder in 97.3% yield (melting point 171° C.; 1% weight loss: 272° C.).

$^1$H NMR (solvent $D_2O$, TMS reference): +8.65 ppm (d; 1H; ortho-H; 1,2-dimethyl-pyridinium); +8.35 ppm (t; 1H; para-H; 1,2-dimethyl-pyridinium); +7.88 ppm (d; 1H; meta-H; 1,2-dimethyl-pyridinium); +7.80 ppm (t; 1H; meta-H; 1,2-dimethyl-pyridinium); +7.67 ppm (d; 2H; ortho-H;

p-toluenesulphonate); +7.36 ppm (d; 2H; meta-H; p-toluenesulphonate); +4.21 ppm (s; 3H; NCH$_3$; 1,2-dimethyl-pyridinium); +2.77 ppm (s; 3H; ortho-CH$_3$; 1,2-dimethyl-pyridinium); +2.40 ppm (s; 3H; para-CH$_3$; p-toluenesulphonate).

Preparative example 13
Comparison—1,2,5-trimethyl-pyrazinium p-toluenesulfonate of Formula (Ex-13c)

A three-necked round bottom flask equipped with thermometer, condenser and stirring was charged with CH$_3$CN (85 ml) and methyl-p-toluenesulfonate (28.18 g). Then 2,5-dimethyl-pyrazine (14.55 g) was added drop-wise at room temperature. The reaction was stirred at 50° C. and, after 6 hours, it was cooled at room temperature and readily a green solid precipitates from the solution. The mixture was treated with diethyl-ether (150 ml) under stirring. The liquid phase was filtered off and 30.56 g of pure product was recovered as a green powder in 78.7% yield (melting point 128° C.; 1% weight loss: 187° C.).

$^1$H NMR (solvent D$_2$O, TMS reference): +9.09 ppm (s; 1H; ortho-H (—N$^+$(CH$_3$)—); 1,2,5-trimethyl-pyrazinium); +8.74 ppm (s; 1H; ortho-H (—N—); 1,2,5-trimethyl-pyrazinium); +7.67 ppm (d; 2H; ortho-H; p-toluenesulfonate); +7.36 ppm (d; 2H; meta-H; p-toluenesulfonate); +4.29 ppm (s; 3H; NCH$_3$; 1,2,5-trimethyl-pyrazinium); +2.81 ppm (s; 3H; ortho-CH$_3$ (—N$^+$(CH$_3$)—); 1,2,5-trimethyl-pyrazinium); +2.74 ppm (s; 3H; ortho-CH$_3$ (—N—); 1,2,5-trimethyl-pyrazinium); +2.40 ppm (s; 3H; para-CH$_3$; p-toluenesulfonate).

General Compounding Procedure

The salts (P) of preparative examples listed above were compounded between rolls to prepare curable compounds in combination with other ingredients, using as base fluoroelastomer resin a VDF-HFP copolymer commercially available under trade name TECNOFLON® 90HS from Solvay Specialty Polymers Italy S.p.A. (FKM-1, hereinafter).

GM102E phosphonium salt is Benzyl(diethylamino)diphenylphosphonium chloride supplied form Caffaro Industrie (GM 102E, hereinafter); MAGLITE® DE high surface area, high activity magnesium oxide (MgO, herein after) was obtained from Merck;

Armeen® 18D amine is a distilled octadecylamine supplied in flakes form from AkzoNobel (Armeen 18D, hereinafter);

RHENOFIT® CF (GE 1890) calcium hydroxide (Ca(OH)$_2$, herein after) was obtained from Rhein Chemie;

Reinforcing filler Carbon black N990MT was obtained from Cancarb (NT990, hereinafter);

Reinforcing filler Austin Black 325 was obtained from Meister AG (Austin Black, hereinafter)

Reinforcing filler Tremin 283 600 EST was obtained from Quarzwerke all other ingredients were supplied from commercial sources and used as received.

Example 14—Salt (P) of Formula (Ex-1)

Pyridinium salt of preparative example 1 (1.83 parts per weight), calcium hydroxide (4 parts per weight) and NT990 (30 parts per weight) were added to 100 parts by weight of FKM-1 and the mixture was kneaded on a two rolls mill.

Example 15—Salt (P) of Formula (Ex-1)

Pyridinium salt of preparative example1 (1.83 parts per weight), calcium hydroxide (4 parts per weight), NT990 (10 parts per weight) and Austin Black (10 parts by weight) were added to 100 parts by weight of FKM-1 and the mixture was kneaded on a two rolls mill.

Example 16—Salt (P) of Formula (Ex-1)

Pyridinium salt of preparative example1 (1.83 parts per weight), calcium hydroxide (4 parts per weight) and TREMIN 283600 EST (20 parts per weight) were added to 100 parts by weight of FKM-1 and the mixture was kneaded on a two rolls mill.

Example 17—Salt (P) of Formula (Ex-2)

Pyridinium salt of example 2 (1.55 parts per weight), calcium hydroxide (4 parts per weight) and NT990 (30 parts per weight) were added to 100 parts by weight of FKM-1 and the mixture was kneaded on a two rolls mill.

Example 18—Salt (P) of Formula (Ex-3)

Pyridinium salt of example 3 (1.55 parts per weight), calcium hydroxide (4 parts per weight) and NT990 (30 parts per weight) was added to 100 parts by weight of FKM-1 and the mixture was kneaded on a two rolls mill.

Example 19—Salt (P) of Formula (Ex-1) and MgO

Pyridinium salt of example 1 (1.83 parts per weight), Magnesium oxide (7 parts per weight) and NT990 carbon black (30 parts per weight) was added to 100 parts by weight of FKM-1 and the mixture was kneaded on a two rolls mill.

Example 20—Salt (P) of Formula (Ex-1) and SrOH$_2$

Pyridinium salt of example 1 (1.83 parts per weight), Strontium hydroxide (6.3 parts per weight) and NT990 carbon black (30 parts per weight) was added to 100 parts by weight of FKM-1 and the mixture was kneaded on a two rolls mill.

Example 21 Mixed Bases—Salt (P) of Formula (Ex-1) with Ca(OH)$_2$ and Organic Base Pyridinium salt of example 1 (1.83 parts per weight), calcium hydroxide (4 parts per weight), guanidine hydrochloride (0.5 parts per weight) and NT990 (30 parts per weight) were added to 100 parts by weight of FKM-1 and the mixture was kneaded on a two rolls mill.

Example 22 Mixed Bases—Salt (P) of Formula (Ex-1) with Ca(OH)$_2$ and Organic Base Pyridinium salt of example 1 (1.83 parts per weight), calcium hydroxide (4 parts per weight), Armeen 18D (1 part per weight) and NT990 carbon black (30 parts per weight) were added to 100 parts by weight of FKM-1 and the mixture was kneaded on a two rolls mill.

Example 23 Mixed Bases—Salt (P) of Formula (Ex-1) with Ca(OH)$_2$ and Organic Base Pyridinium salt of example 1 (1.83 parts per weight), calcium hydroxide (4 parts per weight), 1,3-di-o-tolylguanidine (1 part per weight) and NT990 carbon black (30 parts per weight) were added to 100 parts by weight of FKM-1 and the mixture was kneaded on a two rolls mill.

Example 24 Mixed Bases—Salt (P) of Formula (Ex-1) with Ca(OH)$_2$ and Organic Base Pyridinium salt of example 1 (1.83 parts per weight), calcium hydroxide (4 parts per weight), Potassium tertbutylate (0.5 parts per weight) and NT990 (30 parts per weight) was added to 100 parts by weight of FKM-1 and the mixture was kneaded on a two rolls mill.

Example 25 Mixed Bases—Salt (P) of Formula (Ex-1) with Ca(OH)$_2$ and Organic Base Pyridinium salt of example 1 (1.83 parts per weight), calcium hydroxide (4 parts per weight), Sodium tosylate (14 parts per weight) and NT990 carbon black (30 parts per weight) were added to 100 parts by weight of FKM-1 and the mixture was kneaded on a two rolls mill.

Example 26—Salt (P) of Formula (Ex-1) with Organic Base

Pyridinium salt example 1 (1.83 parts per weight), trimethylpyridine (4 parts per weight), and NT990 carbon black (30 parts per weight) were added to 100 parts by weight of FKM-1 and the mixture was kneaded on a two rolls mill.

Example 27—Salt (P) of Formula (Ex-1) with Organic Base

Pyridinium salt of example 1 (1.83 parts per weight), Di-o-tolylguanidine (8 parts per weight), and NT990 carbon black (30 parts per weight) were added to 100 parts by weight of FKM-1 and the mixture was kneaded on a two rolls mill.

Example 28—Salt (P) of Formula (Ex-1) with Organic Base

Pyridinium salt of example 1 (1.83 parts per weight), N,N dimethyloctylamine (6 parts per weight), and NT990 carbon black (30 parts per weight) were added to 100 parts by weight of FKM-1 and the mixture was kneaded on a two rolls mill.

Example 29—Salt (P) of Formula (Ex-1) with Organic Base

Pyridinium salt of example 1 (1.83 parts per weight), N,N dimethyldodecylamine (6 parts per weight) and NT990 carbon black (30 parts per weight) were added to 100 parts by weight of FKM-1 and the mixture was kneaded on a two rolls mill.

Example 30—Salt (P) of Formula (Ex-1) with Organic Base

Pyridinium salt of example 1 (1.83 parts per weight), trioctylamine (6 parts per weight) and NT990 carbon black (30 parts per weight) were added to 100 parts by weight of FKM-1 and the mixture was kneaded on a two rolls mill.

Example 31—Salt (P) of Formula (Ex-1) with Organic Base

Pyridinium salt of example 1 (1.83 parts per weight), trihexylamine (6 parts per weight) and NT990 carbon black (30 parts per weight) were added to 100 parts by weight of FKM-1 and the mixture was kneaded on a two rolls mill.

Example 32—Salt (P) of Formula (Ex-1) with Organic Base

Pyridinium salt of example 1 (1.83 parts per weight), urea (3 parts per weight) and NT990 carbon black (30 parts per weight) were added to 100 parts by weight of FKM-1 and the mixture was kneaded on a two rolls mill.

Example 33—Salt (P) of Formula (Ex-1) with Ca(OH)$_2$ and Solvent

Pyridinium salt of example 1 (1.83 parts per weight), calcium hydroxide (4 parts per weight), sulfulane (1.5 parts per weight) and NT990 carbon black (30 parts per weight) were added to 100 parts by weight of FKM-1 and the mixture was kneaded on a two rolls mill.

Example 34—Salt (P) of Formula (Ex-1) with Ca(OH)$_2$ and Solvent

Pyridinium salt example1 (1.83 parts per weight), calcium hydroxide (4 parts per weight), N-methyl-N'-butyl pyrrolidinium bis(trifluoromethyl) sulfonylimide (1.5 parts per weight) and NT990 carbon black (30 parts per weight) were added to 100 parts by weight of FKM-1 and the mixture was kneaded on a two rolls mill.

Example 35—Salt (P) of Formula (Ex-4) with Ca(OH)$_2$

Pyridinium salt of example 4 (2.4 parts per weight), calcium hydroxide (4 parts per weight) and NT990 carbon black (30 parts per weight) were added to 100 parts by weight of FKM-1 and the mixture was kneaded on a two roll mill.

Example 36—Salt (P) of Formula (Ex-5) with Ca(OH)$_2$

Pyridinium salt of example 5 (2.4 parts per weight), calcium hydroxide (4 parts per weight) and NT990 carbon black (30 parts per weight) were added to 100 parts by weight of FKM-land the mixture was kneaded on a two rolls mill.

Example 37—Salt (P) of Formula (Ex-6) with Ca(OH)$_2$

Pyridinium salt of example 6 (3.6 parts per weight), calcium hydroxide (4 parts per weight) and NT990 carbon black (30 parts per weight) were added to 100 parts by weight of FKM-1 and the mixture was kneaded on a two rolls mill.

Example 38—Salt (P) of formula (Ex-7) with Ca(OH)$_2$

Pyridinium salt of example 7 (3.6 parts per weight), calcium hydroxide (4 parts per weight) and NT990 carbon black (30 parts per weight) were added to 100 parts by weight of FKM-1 and the mixture was kneaded on a two rolls mill.

Example 39—Salt (P) of formula (Ex-8) with Ca(OH)$_2$ and Solvent

Pyridinium salt of example 8 (5.4 parts per weight), calcium hydroxide (4 parts per weight), N-methyl-N'-butyl pyrrolidinium bis(trifluoromethyl) sulfonylimide (1.5 parts per weight) and NT990 carbon black (30 parts per weight) were added to 100 parts by weight of FKM-1 and the mixture was kneaded on a two rolls mill.

Example 40—Salt (P) of Formula (Ex-9) with Ca(OH)$_2$

Pyridinium salt of example 9 (7 parts per weight), calcium hydroxide (4 parts per weight) and NT990 carbon black (30 parts per weight) were added to 100 parts by weight of FKM-1 and the mixture was kneaded on a two rolls mill.

Comparative Example 41—Salt (P) of Formula (Ex-10c) with Ca(OH)$_2$

Pyridinium salt of example 10c (1.83 parts per weight), calcium hydroxide (4 parts per weight) and N990MT carbon black (30 parts per weight) were added to 100 parts by weight of FKM-1 and the mixture was kneaded on a two rolls mill.

Comparative Example 42—Salt (P) of formula (Ex-11c) with Ca(OH)$_2$

Pyridinium salt of example 11c (1.83 parts per weight), calcium hydroxide (4 parts per weight) and N990MT carbon black (30 parts per weight) were added to 100 parts by weight of FKM-1 and the mixture was kneaded on a two rolls mill.

Comparative Example 43—Salt (P) of Formula (Ex-12c) with Ca(OH)$_2$

Pyridinium salt of example 12 (1.83 parts per weight), calcium hydroxide (4 parts per weight) and N990MT carbon black (30 parts per weight) were added to 100 parts by weight of FKM-1 and the mixture was kneaded on a two rolls mill.

Comparative Example 44—Salt (P) of Formula (Ex-13c) with Ca(OH)$_2$

Pyridinium salt of example 13 (1.83 parts per weight), calcium hydroxide (4 parts per weight) and N990MT carbon black (30 parts per weight) were added to 100 parts by weight of FKM-1 and the mixture was kneaded on a two rolls mill.

Comparative Example 45—Salt (P) of Formula (Ex-1)

Pyridinium salt of example 1 (1.83 parts per weight), and N990MT carbon black (30 parts per weight) were added to 100 parts by weight of FKM-1 and the mixture was kneaded on a two rolls mill.

Comparative Example 46—Trimethylpyridine

Trimethylpyridine (1.83 parts per weight) and N990MT carbon black (30 parts per weight) were added to 100 parts by weight of FKM-1 and the mixture was kneaded on a two rolls mill.

Comparative Example 47—FKM-1 with Bisphenol AF

Bisphenol AF (1.6 parts per weight), Magnesium oxide (7 parts per weight), GM102E (0.4 parts per weight) and N990MT carbon black (30 parts per weight) were added to 100 parts by weight of FKM-1 and the mixture was kneaded on a two rolls mill.

Characterization of Cure Behaviour

Cure behaviour was characterized by Moving Die Rheometer (MDR), at 170° C., by determining the following properties:

$M_L$=Minimum torque (lb×in)
$M_H$=Maximum torque (lb×in)
$\Delta M = M_H - M_L$ (lb×in).

Plaques and O-rings (size class=214) have been cured in a pressed mould and then post-treated in an air circulating oven in conditions (time, temperature) below specified.

The tensile properties have been determined on specimens punched out from the plaques, according to the ASTMD412C Standard at 23° C.

M 50 is the tensile strength in MPa at an elongation of 50%

M 100 is the tensile strength in MPa at an elongation of 100%

T.S. is the tensile strength in MPa;

E.B. is the elongation at break in %.

The Shore A hardness (3") (HDS) has been determined on 3 pieces of plaque piled according to the ASTM D 2240 method.

The compression set (C-SET) has been determined on O-ring, spaceman standard AS568A (type 214) or on 6 mm buttons (type 2), according to the ASTM D 395, method B, at 200° C. for 70 h.

Results are summarized in tables below.

Table 1 compares the results obtained using different fillers, with same salt (P) of Ex. 1.

TABLE 1

|  | EX 14 | EX 15 | EX 16 |
|---|---|---|---|
| MDR 170° C. | | | |
| $M_L$ (lb*in) | 1.1 | 1.1 | 1.1 |
| $M_H$ (lb*in) | 10.3 | 9.8 | 8.9 |
| Mechanical Properties | | | |
| T.S. (MPa) | 11.9 | 11.6 | 9.4 |
| M 50 (MPa) | 2.1 | 2.0 | 1.7 |
| M 100 (MPa) | 4.6 | 4.7 | 3.8 |
| E.B. (%) | 222 | 215 | 210 |
| HDS | 68 | 65 | 61 |
| C-SET | 38 | 27 | 44 |

Table 2 compares behaviour of different salts (P), as above detailed, which differ because of their counteranion.

TABLE 2

|  | EX 14 | EX 17 | EX 18 |
|---|---|---|---|
| MDR 170° C. | | | |
| $M_L$ (lb*in) | 1.1 | 0.4 | 1.6 |
| $M_H$ (lb*in) | 10.3 | 6.1 | 12.0 |
| Mechanical Properties | | | |
| T.S. (MPa) | 11.9 | — | 12.9 |
| M 50 (MPa) | 2.1 | — | 2.4 |
| M 100 (MPa) | 4.6 | — | 5.5 |

TABLE 2-continued

|  | EX 14 | EX 17 | EX 18 |
|---|---|---|---|
| E.B. (%) | 222 | — | 207 |
| HDS | 68 | — | 68 |
| C-SET | 38 | — | 45 |

The symbol "—" indicates that determination was not performed.

Table 3 compares the results obtained using different inorganic bases, with same salt (P).

TABLE 3

|  | EX 14 | EX 19 | EX 20 |
|---|---|---|---|
| MDR 170° C. | | | |
| $M_L$ (lb*in) | 1.1 | 1.5 | 1.0 |
| $M_H$ (lb*in) | 10.3 | 10.7 | 15.8 |
| Mechanical Properties | | | |
| T.S. (MPa) | 11.9 | 16.5 | 12.5 |
| M 50 (MPa) | 2.1 | 2.8 | 2.8 |
| M 100 (MPa) | 4.6 | 7.8 | 6.8 |
| E.B. (%) | 222 | 163 | 195 |
| HDS | 68 | 70 | 72 |
| C-Set | 38 | 49 | 49 |

Table 4 summarizes results obtained with mixtures of organic and inorganic bases, with same salt (P).

TABLE 4

|  | EX 14 | EX 21 | EX 22 | EX 23 | EX 24 | EX 25 |
|---|---|---|---|---|---|---|
| MDR 170° C. | | | | | | |
| $M_L$ (lb*in) | 1.1 | 1.4 | 1.1 | 1.4 | 2.2 | 1.2 |
| $M_H$ (lb*in) | 10.3 | 12.5 | 13.6 | 16.0 | 10.3 | 7.9 |
| Mechanical Properties | | | | | | |
| T.S. (MPa) | 11.9 | 13.5 | 13.8 | 14.6 | 13.2 | 9.3 |
| M 50 (MPa) | 2.1 | 2.8 | 2.8 | 3.1 | 2.2 | 2.9 |
| M 100 (MPa) | 4.6 | 7.1 | 7.4 | 9.3 | 5.5 | 4.8 |
| E.B. (%) | 222 | 168 | 158 | 138 | 196 | 199 |
| HDS | 68 | 73 | 72 | 71 | 66 | 75 |
| C-Set | 38 | 40 | 39 | 43 | 35 | 57 |

Table 5 summarizes results obtained with different organic bases.

TABLE 5

|  | EX 14 | EX 26 | EX 27 | EX 28 | EX 29 | EX 30 | EX 31 | EX 32 |
|---|---|---|---|---|---|---|---|---|
| MDR 170° C. | | | | | | | | |
| ML (lb*in) | 1.1 | 0.4 | 1.1 | 0.9 | 0.6 | 0.6 | 0.6 | 0.8 |
| MH (lb*in) | 10.3 | 4.9 | 5.2 | 9.6 | 8.6 | 6.9 | 9.6 | 4.3 |
| Mechanical Properties | | | | | | | | |
| T.S. (MPa) | 11.9 | 15.9 | — | — | — | — | — | — |
| M 50 (MPa) | 2.1 | 2.3 | — | — | — | — | — | — |
| M 100 (MPa) | 4.6 | 5.9 | — | — | — | — | — | — |
| E.B. (%) | 222 | 186 | — | — | — | — | — | — |
| HDS | 68 | 69 | — | — | — | — | — | — |
| C-Set | 38 | 53 | — | — | — | — | — | — |

Table 6 shows results obtained with the addition of a co-solvent.

TABLE 6

|  | EX 14 | EX 33 | EX 34 |
|---|---|---|---|
| MDR 170° C. | | | |
| ML (lb*in) | 1.1 | 1.1 | 1.1 |
| MH (lb*in) | 10.3 | 11.0 | 11.5 |
| Mechanical Properties | | | |
| T.S. (MPa) | 11.9 | 12.9 | 13.2 |
| M 50 (MPa) | 2.1 | 2.2 | 2.3 |
| M 100 (MPa) | 4.6 | 5.5 | 5.7 |
| E.B. (%) | 222 | 201 | 197 |
| HDS | 68 | 67 | 68 |
| C-Set | 38 | 41 | 35 |

Table 7 shows the performances achieved using different salts (P)

TABLE 7

|  | EX 14 | EX 35 | EX 36 | EX 37 | EX 38 | EX 39 | EX 40 |
|---|---|---|---|---|---|---|---|
| MDR 170° C. | | | | | | | |
| $M_L$ (lb*in) | 1.1 | 1.1 | 1.1 | 1.1 | 1.1 | 1.1 | 0.9 |
| $M_H$ (lb*in) | 10.3 | 10.9 | 10.0 | 14.2 | 17.2 | 8.9 | 9.0 |
| Mechanical Properties | | | | | | | |
| T.S. (MPa) | 11.9 | 12.8 | 12.4 | 12.5 | 15.6 | 10.7 | 8.3 |
| M 50 (MPa) | 2.1 | 2.1 | 2.1 | 8.1 | 8.6 | 2.4 | 3.1 |
| M 100 (MPa) | 4.6 | 4.4 | 4.3 | 0 | 0 | 4.5 | 4.8 |
| E.B. (%) | 222 | 228 | 241 | 69 | 77 | 239 | 269 |
| HDS | 68 | 68 | 68 | 82 | 81 | 72 | 78 |
| C-Set | 38 | 42 | 43 | 53 | 49 | 57 | 61 |

Table 8 comprises a comparison among performances achievable with salts (P) according to the invention, with respect to pyridinium salts or pyridine derivatives which do not fulfil all structural requirements of salts (P); from comparison below, it is clear that only salts (P) possessing the structural feature claimed, i.e. possessing at least two groups having reactive hydrogens in ortho or para position to the pyridinium-type quaternized nitrogen are effective crosslinking agents in combination with bases for fluoroelastomers.

Indeed, in comparative examples, MDR data clearly show that there is substantially no cross-linking, as the difference between $M_H$ and $M_L$ is at most 1.5 (lb*in), for comparative compounds.

Generally, an acceptable level of cross-linking is achieved when the said difference between $M_H$ and $M_L$ is at least 2.5 (lb*in), as achieved in all examples according to the invention.

TABLE 8

|  | EX 14 | EX 41c | EX 42c | EX 43c | EX 44c | EX 45c | EX 46c |
|---|---|---|---|---|---|---|---|
| MDR 170° C. | | | | | | | |
| $M_L$ (lb*in) | 1.1 | 1.1 | 1.1 | 1.1 | 1.1 | 0.5 | 0.5 |
| $M_H$ (lb*in) | 10.3 | 2.0 | 2.1 | 1.7 | 1.8 | 0.5 | 0.5 |

Chemical Resistance

Acetic acid resistance test has been performed according to ASTM D471, e.g. by exposing cured specimens to acetic acid for 500 hours at 100° C. (pH=2.5) in thereby defined conditions and evaluating variation in mechanical properties, weight and volume (swelling-related properties) for samples before and after said exposure to acetic acid.

Table 9 herein below compares the performances obtained with cured specimens obtained from the compositions of the invention (i.e. using pyridinium salts and base, as described above as crosslinking system) with respect to performances achieved when curing said base gum with a traditional ionic curing system, based on bis-phenol AF as cross-linking agent, and phosphonium salt accelerant.

TABLE 9

|  | EX 14 | EX 21 | EX 26 | EX 47c |
| --- | --- | --- | --- | --- |
| T.S. change (%) | 0 | −2 | 15 | −46 |
| E.B. change (%) | 11 | 15 | 8 | −37 |
| Shore A difference | −3 | −2 | −1 | −18 |
| Volume Change (%) | 5.7 | 5.4 | 1.7 | 48 |
| Weight Change (%) | 3.2 | 3.0 | 1.0 | 25 |

As evident from data above, the exposure to acetic acid does not generate any significant swelling/weight gain in cured specimens obtained from the composition of the present invention, while ionically cured sample undergoes a significant swelling and decrease of mechanical properties.

Additional chemical resistance tests were carried out according to similar procedure but through exposure to ASTM 105G fluid (lubricant oil) for 168 hours at 150° C. (see Table 10) and to Dexron VI (motor oil) for 1500 hours at 150° C. (see Table 11).

TABLE 10

|  | EX 21 | EX 47c |
| --- | --- | --- |
| T.S. change (%) | −15 | −67 |
| E.B. change (%) | −21 | −60 |
| Shore A difference | 3 | 7 |
| Volume Change (%) | 0.9 | 0.8 |
| Weight Change (%) | 0.5 | 0.4 |

The exposure to ASTM 105G fluid has been shown to generate a very low decrease of mechanical properties in cured specimens obtained from the composition of the invention, while ionically cured samples undergoes a substantial detrimental decrease of mechanical properties.

TABLE 11

|  | EX 21 | EX 47c |
| --- | --- | --- |
| T.S. change (%) | −14 | −51 |
| E.B. change (%) | −6 | −62 |
| Shore A difference | −3 | −2 |
| Volume Change (%) | 3 | 3 |
| Weight Change (%) | 1.5 | 1.5 |

Similarly, the exposure to Dexron VI has been shown to generate a very low decrease of mechanical properties in cured specimens obtained from the composition of the invention, while ionically cured samples undergoes a substantial detrimental decrease of mechanical properties in similar conditions.

The invention claimed is:
1. A fluoroelastomer composition [composition (C)] comprising:
at least one vinylidene-fluoride based fluoroelastomer comprising recurring units derived from vinylidene fluoride (VDF) and from at least one additional (per) fluorinated monomer different from VDF [fluoroelastomer (A)];
at least one basic compound [base (B)];
at least one pyridinium salt [salt (P)] complying with any of formulae (P-1) to (P-12):

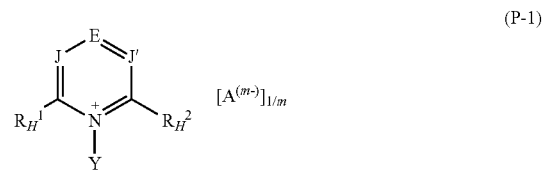

(P-1)

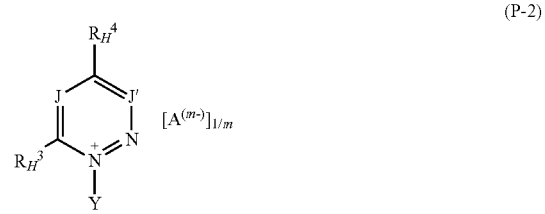

(P-2)

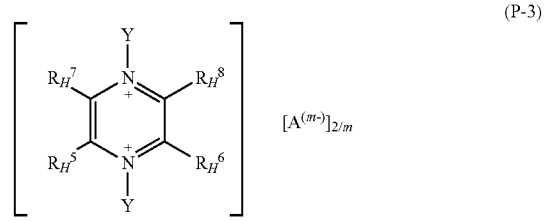

(P-3)

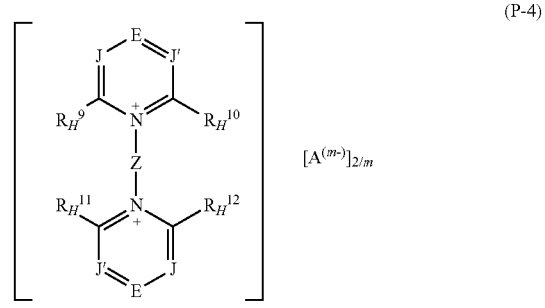

(P-4)

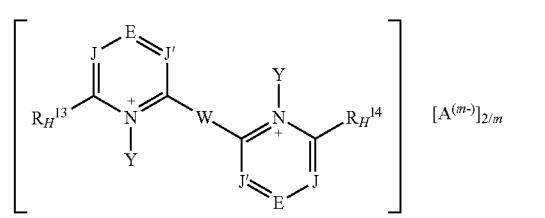

(P-5)

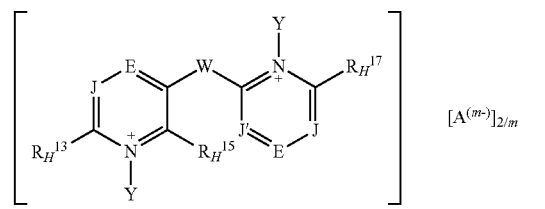

(P-6)

-continued

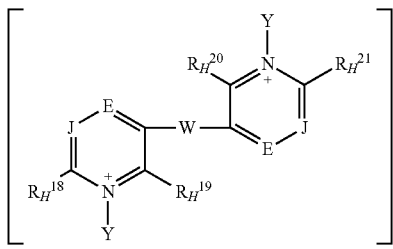

(P-7)

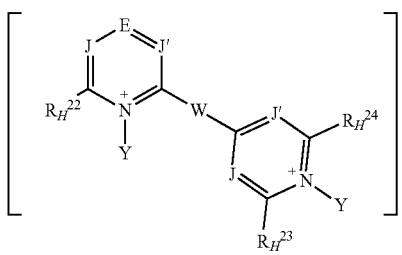

(P-8)

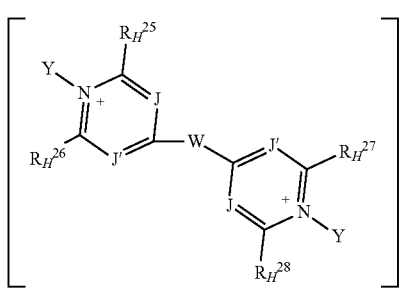

(P-9)

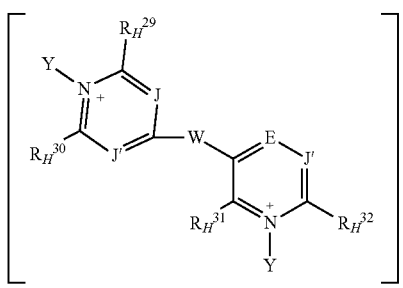

(P-10)

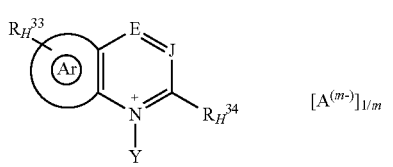

(P-11)

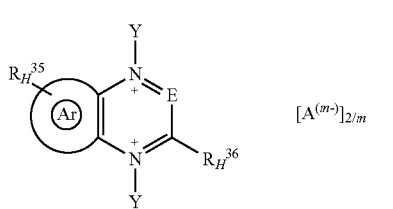

(P-12)

wherein:
each of J and J', equal to or different from each other, is independently at each occurrence C—R* or N, wherein R* is H or a $C_1$-$C_{12}$ hydrocarbon group;
E is N or a group of formula C—$R°_H$;
Z is a divalent hydrocarbon group comprising from 1 to 12 carbon atoms;
W is a bond or is a bridging group selected from the group consisting of divalent hydrocarbon groups comprising from 1 to 12 carbon atoms and divalent fluorocarbon groups comprising from 1 to 12 carbon atoms;
the group sketched with symbol:

in formula (P-11) and (P-12) designates an aromatic mono- or poly-nuclear ring condensed to the pyridinium-type aromatic ring, which may comprise one or more additional nitrogen atoms, optionally quaternized nitrogen atoms, in the ring(s);
each of $R^1_H$, $R^2_H$, $R^3_H$, $R^4_H$, $R^5_H$, $R^6_H$, $R^7_H$, $R^8_H$, $R^9_H$, $R^{10}_H$, $R^{11}_H$, $R^{12}_H$, $R^{13}_H$, $R^{14}_H$, $R^{15}_H$, $R^{16}_H$, $R^{17}_H$, $R^{18}_H$, $R^{19}_H$, $R^{20}_H$, $R^{21}_H$, $R^{22}_H$, $R^{23}_H$, $R^{24}_H$, $R^{25}_H$, $R^{26}_H$, $R^{27}_H$, $R^{28}_H$, $R^{29}_H$, $R^{30}_H$, $R^{31}_H$, $R^{32}_H$, $R^{33}_H$, $R^{34}_H$, $R^{35}_H$, $R^{36}_H$ and $R°_H$, equal to or different from each other, is independently at each occurrence —H or a group of formula [group (alpha-H)]:

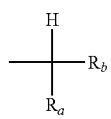

wherein $R_a$, and $R_b$, equal to or different from each other, are independently H or a hydrocarbon $C_1$-$C_6$ group;
Y, equal to or different from each other, is independently oxygen or a $C_1$-$C_{12}$ hydrocarbon group, optionally comprising one or more than one heteroatoms selected from N, O, S and halogens;
$A^{(m-)}$ is an anion having valency m;
with the provisio that
(i) when salt (P) is of formula (P-1) at least two of $R^1_H$, $R^2_H$, and $R°_H$ are groups (alpha-H);
(ii) when salt (P) is of formula (P-2) $R^3_H$ and $R^4_H$ are groups (alpha-H);
(iii) when salt (P) is of formula (P-3), at least two of $R^5_H$, $R^6_H$, $R^7_H$, and $R^8_H$ are groups (alpha-H);
(iv) when salt (P) is of formula (P-4), at least two of $R^9_H$, $R^{10}_H$, $R^{11}_H$, $R^{12}_H$, and $R°_H$ are groups (alpha-H);
(v) when salt (P) is of formula (P-5), at least two of $R^{13}_H$, $R^{14}_H$, and $R°_H$ are groups (alpha-H);
(vi) when salt (P) is of formula (P-6), at least two of $R^{15}_H$, $R^{16}_H$, $R^{17}_H$, and $R°_H$ are groups (alpha-H);
(vii) when salt (P) is of formula (P-7), at least two of $R^{18}_H$, $R^{19}_H$, $R^{20}_H$, $R^{21}_H$, and $R°_H$ are groups (alpha-H);
(viii) when salt (P) is of formula (P-8), at least two of $R^{22}_H$, $R^{23}_H$, $R^{24}_H$, and $R°_H$ are groups (alpha-H);
(ix) when salt (P) is of formula (P-9), at least two of $R^{25}_H$, $R^{26}_H$, $R^{27}_H$, and $R^{28}_H$ are groups (alpha-H);
(x) when salt (P) is of formula (P-10), at least two of $R^{29}_H$, $R^{30}_H$, $R^{31}_H$, $R^{32}_H$, and $R^{28}_H$ are groups (alpha-H);

(xi) when salt (P) is of formula (P-11), at least two of $R^{33}{}_H$, $R^{34}{}_H$, and $R^{28}{}_H$ are groups (alpha-H); and (xii) when salt (P) is of formula (P-12), at least two of $R^{35}{}_H$, $R^{36}{}_H$ and $R^{\circ}{}_H$ are groups (alpha-H).

2. The composition (C) of claim 1, (1) wherein salts (P) of formula (P-1) comply with formulae (P-1-a) to (P-1-e):

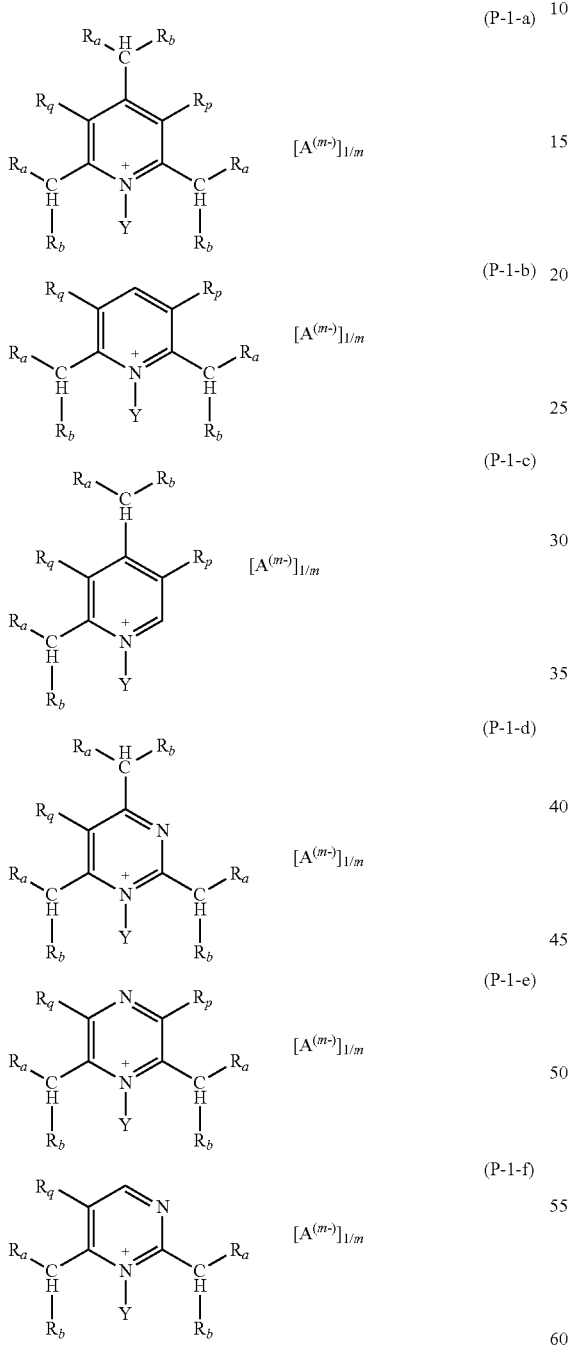

wherein:

$R_a$ and $R_b$ have the meaning as defined in claim 1;

Y has the meaning as defined in claim 1;

each of $R_p$ and $R_q$, equal to or different from each other, is H or a $C_1$-$C_{12}$ hydrocarbon group;

A and m have the meanings as defined in claim 1; and/or (2) wherein salts (P) of formula (P-2) comply with formula (P-2-a):

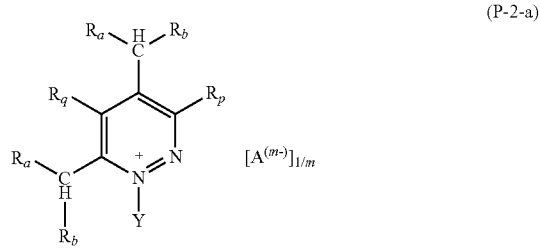

wherein:

$R_a$ and $R_b$ have the meaning as defined in claim 1;

Y has the meaning as defined in claim 1;

each of $R_p$ and $R_q$, equal to or different from each other, is H or a $C_1$-$C_{12}$ hydrocarbon group;

A and m have the meanings as defined in claim 1; and/or (3) wherein salts (P) of formula (P-3) comply with formula (P-3-a):

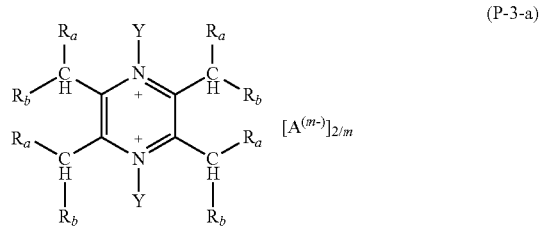

wherein:

$R_a$ and $R_b$ have the meaning as defined in claim 1;

Y has the meaning as defined in claim 1;

A and m have the meanings as defined in claim 1; and/or (4) wherein salts (P) of formula (P-4) comply with formula (P-4-a):

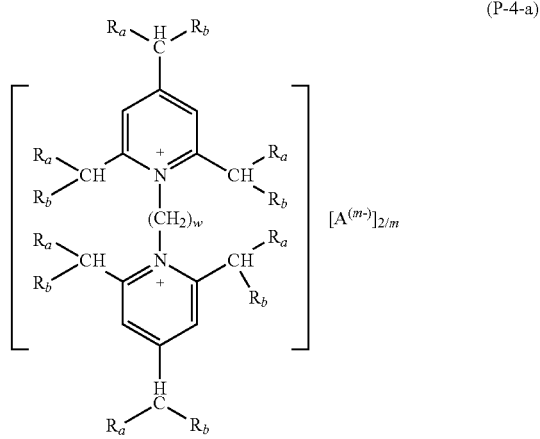

wherein:
R$_a$ and R$_b$ have the meaning as defined in claim 1;
w is an integer of 1 to 12;
A and m have the meanings as defined in claim 1;
and/or
(5) wherein salts (P) of formula (P-5) comply with formula (P-5-a):

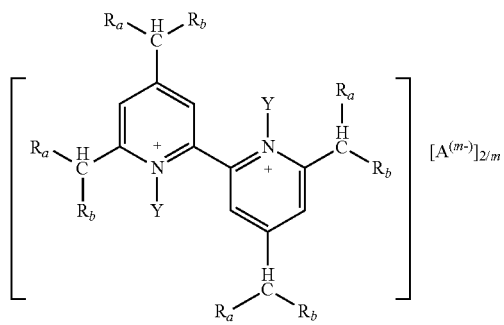

(P-5-a)

wherein:
R$_a$ and R$_b$ have the meaning as defined in claim 1;
Y has the meaning as defined in claim 1;
A and m have the meanings as defined in claim 1;
and/or
(6) wherein salts (P) of formula (P-11) comply with formula (P-11-a):

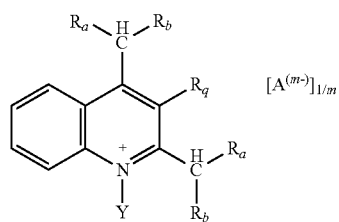

(P-11-a)

wherein:
R$_a$ and R$_b$ have the meaning as defined in claim 1;
Y has the meaning as defined in claim 1;
A and m have the meanings as defined in claim 1;
and/or
(7) wherein salts (P) of formula (P-12) comply with formula (P-12-a):

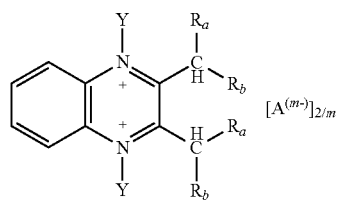

(P-12-a)

wherein:
R$_a$ and R$_b$ have the meaning as defined in claim 1;
Y has the meaning as defined in claim 1;
A and m have the meanings as defined in claim 1.

3. The composition (C) of claim 1, wherein salt (P) is selected from the group consisting of salts (P) of formula (P-1), (P-2), (P-3), (P-4), (P-5), (P-11), and (P-12).

4. The composition (C) of claim 3, wherein salt (P) is selected from salts of formulae (Ex-1) to (Ex-9):

(Ex-1)

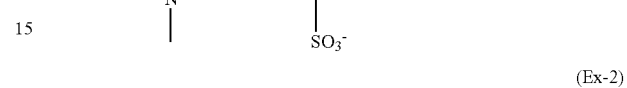

(Ex-2)

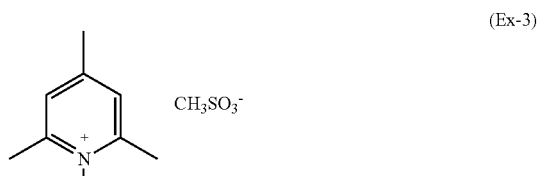

(Ex-3)

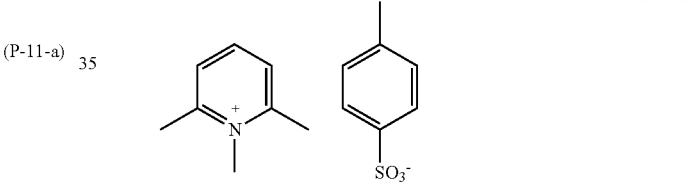

(Ex-4)

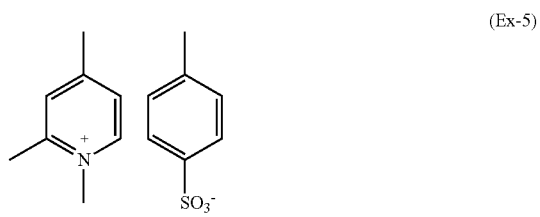

(Ex-5)

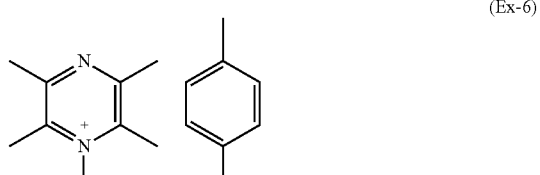

(Ex-6)

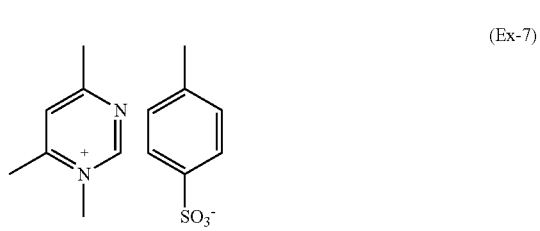

(Ex-7)

-continued

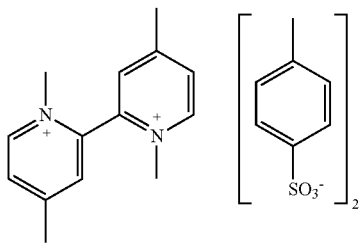
(Ex-8)

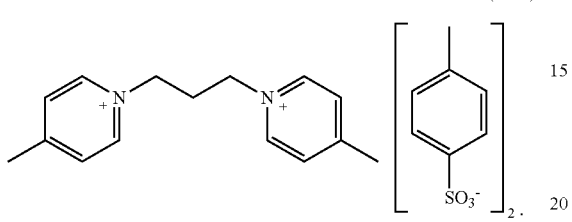
(Ex-9)

5. The composition (C) of claim 1, wherein composition (C) comprises salt (P) in an amount of at least 0.1 weight part per 100 weight parts of fluoroelastomer (A), and/or in an amount of at most 20 weight parts per 100 parts of fluoroelastomer (A).

6. The composition (C) of claim 1, wherein base (B) comprises one or more than one organic base, one or more than one inorganic base or mixtures of organic and inorganic base(s).

7. The composition (C) of claim 1, wherein base (B) is an inorganic base selected from the group consisting of:
i) divalent metal oxides;
ii) hydroxides of metals; and
iii) metal salts of weak acids having a $pK_a$ higher than 3.

8. The composition (C) of claim 1, wherein base (B) is an organic base selected from the group consisting of:
(j) non-aromatic amines or amides complying with general formula (B1m) or (B1d):

$$R_{bm}-[C(O)]_t-NR^H_2 \quad (B1m)$$

$$R^H_2N-[C(O)]_{t'}-R_{dm}-[C(O)]_{t''}-NR^H_2 \quad (B1d)$$

wherein:
each of t, t' and t", equal to or different from each other and at each occurrence is zero or 1;
each of $R^H$ is independently H or a $C_1$-$C_{12}$ hydrocarbon group;
$R_{bm}$ is a monovalent hydrocarbon non-aromatic group having 1 to 30 carbon atoms;
$R_{bm}$ is a divalent hydrocarbon non-aromatic group having 1 to 30 carbon atoms; and
(jj) cycloaliphatic secondary or tertiary amines complying with general formula (B2m) or (B2d):

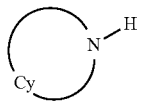
(B2m)

(B2d)

wherein:
Cy represents a divalent aliphatic group comprising at least 4 carbon atoms, optionally comprising one or more than one ethylenically unsaturated double bond, and optionally comprising one or more catenary nitrogen atoms, forming a cycle with the nitrogen atom which is connected thereto;
Cy' represent a trivalent aliphatic group comprising at least 5 carbon atoms, optionally comprising one or more than one ethylenically unsaturated double bond, and optionally comprising one or more catenary nitrogen atoms, forming a cycle with the nitrogen atom which is connected thereto;
(jjj) aromatic amines or amides complying with general formula (B3):

$$Ar_b\text{-}\{[C(O)]_t-NR^H_2\}_w \quad (B3)$$

wherein:
t, equal to or different from each other and at each occurrence, is zero or 1;
w is an integer of 1 to 4;
each of $R^H$ is independently H or a $C_1$-$C_{12}$ hydrocarbon group;
$Ar_b$ is a mono- or poly-nuclear aromatic group, optionally comprising one or more than one catenary heteroatoms selected from the group consisting of S and O;
(jv) heteroaromatic amines comprising at least one nitrogen atom comprised in a heteroaromatic cycle;
(v) guanidine derivatives of formula (B4) or (B5):

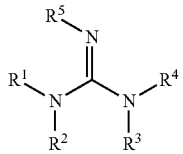
(B4)

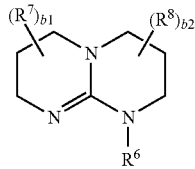
(B5)

wherein:
each of $R^1$, $R^2$, $R^3$, $R^4$, $R^5$, $R^6$, $R^7$, and $R^8$, equal to or different from each other, is independently H or a $C_1$-$C_{12}$ hydrocarbon group and corresponding salts of said guanidines (B4) and (B5);
(vj) metal alkoxylates.

9. The composition (C) of claim 6, wherein composition (C) comprises at least one organic base and at least one inorganic base.

10. The composition (C) of claim 1, said composition additionally comprising one or more than one organic solvents [solvent (S)] selected from those wherein salt (P) has a solubility at room temperature exceeding 1 g/l.

11. The composition (C) of claim 1, wherein fluoroelastomer (A) comprises at least 15% moles of recurring units derived from VDF, with respect to all recurring units of the fluoroelastomer, and/or wherein the fluoroelastomer (A) comprises at most 85% moles of recurring units derived from VDF, with respect to all recurring units of the fluoroelastomer.

12. The composition (C) of claim 1, wherein said at least one additional (per)fluorinated monomer different from VDF is selected from the group consisting of:
(a) $C_2$-$C_8$ perfluoroolefins;
(b) hydrogen-containing $C_2$-$C_8$ olefins different from VDF;
(c) $C_2$-$C_8$ chloro and/or bromo and/or iodo-fluoroolefins;
(d) (per)fluoroalkylvinylethers (PAVE) of formula $CF_2$=$CFOR_f$, wherein $R_f$ is a $C_1$-$C_6$ (per)fluoroalkyl group;
(e) (per)fluoro-oxy-alkylvinylethers of formula $CF_2$=$CFOX$, wherein X is a $C_1$-$C_{12}$ ((per)fluoro)-oxyalkyl comprising catenary oxygen atoms;
(f) (per)fluorodioxoles having formula:

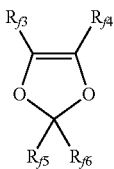

wherein each of $R_{f3}$, $R_{f4}$, $R_{f5}$, $R_{f6}$, equal or different each other, is independently a fluorine atom, a $C_1$-$C_6$ fluoro- or per(halo)fluoroalkyl, optionally comprising one or more oxygen atom,
(g) (per)fluoro-methoxy-vinylethers (MOVE, hereinafter) having formula:

$$CFX_2=CX_2OCF_2OR''_f$$

wherein $R''_f$ is selected from $C_1$-$C_6$ (per)fluoroalkyls, linear or branched; $C_5$-$C_6$ cyclic (per)fluoroalkyls; and $C_2$-$C_6$ (per)fluorooxyalkyls, linear or branched, comprising from 1 to 3 catenary oxygen atoms, and $X_2$ is F or H.

13. The composition of claim 1, wherein fluoroelastomer (A) is selected from the group consisting of fluoroelastomers having the following monomer compositions (in mol %):
(i) vinylidene fluoride (VDF) 35-85%, hexafluoropropene (HFP) 10-45%, tetrafluoroethylene (TFE) 0-30%, perfluoroalkyl vinyl ethers (PAVE) 0-15%, bis-olefin (OF) 0-5%;
(ii) vinylidene fluoride (VDF) 50-80%, perfluoroalkyl vinyl ethers (PAVE) 5-50%, tetrafluoroethylene (TFE) 0-20%, bis-olefin (OF) 0-5%;
(iii) vinylidene fluoride (VDF) 20-30%, $C_2$-$C_8$ non-fluorinated olefins (Ol) 10-30%, hexafluoropropene (HFP) and/or perfluoroalkyl vinyl ethers (PAVE) 18-27%, tetrafluoroethylene (TFE) 10-30%, bis-olefin (OF) 0-5%;
(vii) tetrafluoroethylene (TFE) 33-75%, perfluoroalkyl vinyl ethers (PAVE) 15-45%, vinylidene fluoride (VDF) 5-30%, hexafluoropropene HFP 0-30%, bis-olefin (OF) 0-5%; and
(viii) vinylidene fluoride (VDF) 35-85%, fluorovinyl ethers (MOVE) 5-40%, perfluoroalkyl vinyl ethers (PAVE) 0-30%, tetrafluoroethylene (TFE) 0-40%, hexafluoropropene (HFP) 0-30%, bis-olefin (OF) 0-5%.

14. A method for fabricating a shaped article[s], the method comprising moulding, calendering, or extruding the composition (C) of claim 1, into the shaped article and optionally subjecting the composition (C) to vulcanization.

15. A cured article comprising the composition (C) of claim 1.

16. The composition (C) of claim 2,
(1) wherein salts (P) of formula (P-1) are those complying with formulae (P-1-a) to (P-1-e) and wherein $R_a$ and $R_b$ are each H and Y is methyl; and/or
(2) wherein salts (P) of formula (P-2) are those complying with formula (P-2-a) and wherein $R_a$ and $R_b$ are each H and Y is methyl; and/or
(3) wherein salts (P) of formula (P-3) are those complying with formula (P-3-a) and wherein $R_a$ and $R_b$ are H and Y is methyl; and/or
(4) wherein salts (P) of formula (P-4) are those complying with formula (P-4-a) and wherein $R_a$ and $R_b$ are H and w is 3; and/or
(5) wherein salts (P) of formula (P-5) are those complying with formula (P-5-a) and wherein $R_a$ and $R_b$ are H and Y is methyl; and/or
(6) wherein salts (P) of formula (P-11) are those complying with formula (P-11-a) and wherein $R_a$ and $R_b$ are H and Y is methyl; and/or
(7) wherein salts (P) of formula (P-12) are those complying with formula (P-12-a) and wherein $R_a$ and $R_b$ are H and Y is methyl.

17. The composition (C) of claim 5, wherein composition (C) comprises salt (P) in an amount of at least 1 weight part per 100 weight parts of fluoroelastomer (A) and in an amount of at most 10 weight parts per 100 parts of fluoroelastomer (A).

18. The composition (C) of claim 7, wherein base (B) is an inorganic base selected from the group consisting of:
i) alkali-earth metal oxides and oxides of Zn, Mg, Pb, or Ca;
ii) hydroxides of alkali and alkali-earth metals; and
(iii) Na, K, Ca, Sr, and Ba salts of carbonates, benzoates, oxalates and phosphites.

19. The composition (C) of claim 10, wherein solvent (S) is selected from the group consisting of:
polar aprotic organic solvents selected from the group consisting of sulfolane and 4,4'-dichlorodiphenylsulfone; and
ionic liquids selected from the group consisting of methylpyrrolidinium bis(trifluoromethansulonylimide) of formula PY1,4-Tf$_2$N and 1-butyl-3-methylimidazolium bis(trifluoromethylsulfonylimide) of formula BMIm-Tf$_2$N:

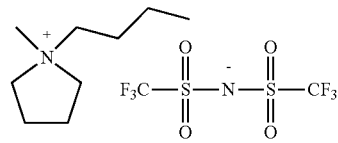

(PY1,4-Tf$_2$N)

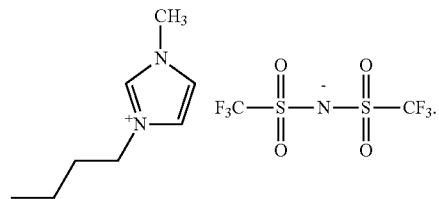

(BMIm-Tf$_2$N)

20. The composition (C) of claim 11, wherein fluoroelastomer (A) comprises at least 35% moles of recurring units derived from VDF, with respect to all recurring units of the fluoroelastomer, and wherein the fluoroelastomer (A) comprises at most 78% moles of recurring units derived from VDF, with respect to all recurring units of the fluoroelastomer.

* * * * *